(12) United States Patent (10) Patent No.: US 12,572,241 B2
Deguine (45) Date of Patent: Mar. 10, 2026

(54) DIGITAL PAINT BRUSH, AND DIGITAL TOOLS AND PROCESSES FOR GENERATING DIGITAL ART USING DIGITAL PAINT BRUSH

(71) Applicant: Etienne Deguine, San Francisco, CA (US)

(72) Inventor: Etienne Deguine, San Francisco, CA (US)

( * ) Notice: Subject to any disclaimer, the term of this patent is extended or adjusted under 35 U.S.C. 154(b) by 0 days.

(21) Appl. No.: 18/961,058

(22) Filed: Nov. 26, 2024

(65) Prior Publication Data

US 2025/0165104 A1 May 22, 2025

Related U.S. Application Data

(63) Continuation of application No. 18/350,407, filed on Jul. 11, 2023, now Pat. No. 12,189,907.

(51) Int. Cl.
*G06F 3/042* (2006.01)
*G06F 3/0354* (2013.01)
*G06F 3/041* (2006.01)

(52) U.S. Cl.
CPC ........ *G06F 3/0425* (2013.01); *G06F 3/03545* (2013.01); *G06F 3/04162* (2019.05)

(58) Field of Classification Search
CPC . G06F 3/0425; G06F 3/04162; G06F 3/03545
See application file for complete search history.

(56) References Cited

U.S. PATENT DOCUMENTS

2022/0206597 A1* 6/2022 Abel ................... G06F 3/03542

OTHER PUBLICATIONS

Sandler, M., et al. (Jan. 13, 2018). "MobileNetV2: Inverted residuals and linear bottlenecks". https://arxiv.org/abs/1801.04381v3.
Chen, L., et al. (Jun. 17, 2017). "Rethinking Atrous convolution for semantic image segmentation". https://arxiv.org/abs/1706.05587.
Chen, L., et al. (May 12, 2017). "DeepLab: Semantic Image Segmentation with Deep Convolutional Nets, Atrous Convolution, and Fully Connected CRFs". https://arxiv.org/pdf/1606.00915.
Laidlow, T., et al. (Jul. 25, 2022). "DeepFusion: Real-Time Dense 3D Reconstruction for Monocular SLAM using Single-View Depth and Gradient Predictions". https://arxiv.org/pdf/2207.12244.
Newcombe, R. A., et al. (2011). "KinectFusion: Real-Time Dense Surface Mapping and Tracking". https://www.microsoft.com/en-us/research/wp-content/uploads/2016/11/ismar_2011.pdf.
Rombach, R., et al. (2011). "High-Resolution Image Synthesis with Latent Diffusion Models". https://arxiv.org/abs/2112.10752.
Saharia, C., et al. (May 23, 2022). "Photorealistic Text-to-Image Diffusion Models with Deep Language Understanding". https://arxiv.org/abs/2205.11487.

(Continued)

*Primary Examiner* — Lisa S Landis
(74) *Attorney, Agent, or Firm* — Cowan, Liebowitz & Latman, P.C.; Mark Montague; Anastasia Zhadina

(57) ABSTRACT

A digital paint brush comprising a handle including a housing for holding one or more electronic components, and a painting tip attached to the handle, wherein the digital paint brush includes at least one image capture apparatus positioned such that a field of view of the at least one image capture apparatus includes the painting tip.

17 Claims, 23 Drawing Sheets

(56)        References Cited

OTHER PUBLICATIONS

Thomas van den Berge. (2021) "Vermillion: Oil Painting Simulation In Virtual Reality: A new tool for digital artists offering the analog control of traditional painting with the benefits of a virtual environment." In ACM SIGGRAPH 2021 Immersive Pavilion (SIGGRAPH '21). Association for Computing Machinery, New York, NY, USA, Article 5, 1-2. https://doi.org/10.1145/3450615.3464542. Mountainborn Studios Lda. (Mar. 24, 2022) "Vermillion—VR Painting" (Version 1.7.0f1) [VR Headset App.] https://www.meta.com/experiences/vermillion-vr-painting/4900967296622279/.

* cited by examiner

622

620

624

624a

624b

624c

624d

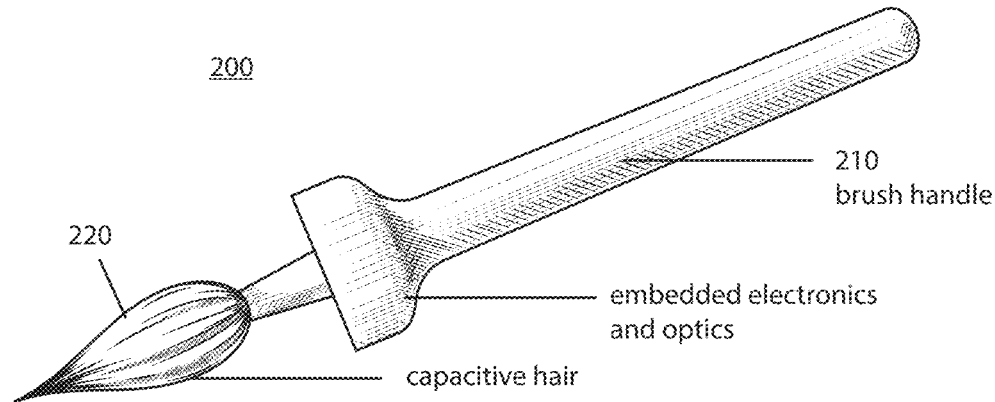
200
220
210
brush handle
embedded electronics
and optics
capacitive hair
FIG. 2A
side view
top view
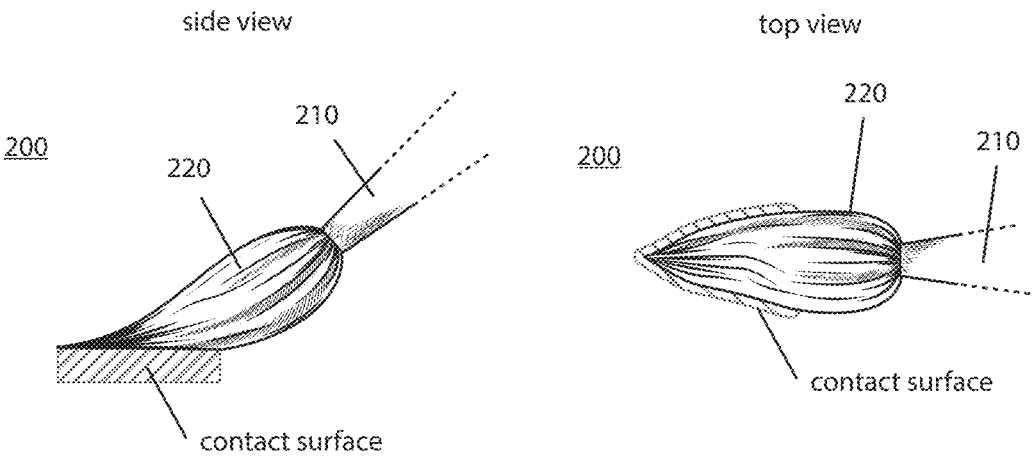
200
220
210
contact surface
200
220
210
contact surface
FIG. 2B                    FIG. 2C Input Outline             Resulting Outline Add grain base brush outline      noise added to the outline      noise totally removed
                         then slowly removed           new outline 700
programmable robotic arm

701 traditional paintbrush
loaded with paint
color A paint color B paint color A mixing with B Input image Trajectory added in yellow The trajectory is replaced with noise with some extra thickness around it to allow for border effects The noise is progressively removed

1703

Resulting prediction

1704

DIGITAL PAINT BRUSH, AND DIGITAL TOOLS AND PROCESSES FOR GENERATING DIGITAL ART USING DIGITAL PAINT BRUSH

INTRODUCTION

This is a continuation of U.S. patent application Ser. No. 18/350,407, filed Jul. 11, 2023, now U.S. Pat. No. 12,189, 907, the contents of which are incorporated herein by reference.

Digital technology and digital art tools have been used to create and display digital artworks including digital drawings, digital paintings, and 2D and 3D visual art. Conventionally, digital artists use graphic drawing tablets, such as a Wacom® graphic tablet, and a digital stylus resembling a traditional pen as an input device for drawing on the surface of the tablet. Typical stylus devices have a tip with a fixed shape and brush strokes input using the stylus are usually determined based on pressure, rotation, azimuth, speed and emulated shape created by software in the tablet. When such stylus devices are used for painting, a user's experience is different from traditional painting media due to the input being more monotonous and deterministic when compared to using traditional paints, such as oil paints, with a bristle brush.

In an attempt to reproduce traditional painting, digital painting software, such as Rebelle 4+ and Corel Painter, has been developed, which attempts to emulate aspects of traditional painting, such as grain, roughness of shape, variety of shapes and paint mixing. In addition, specialized stylus brush tips or stylus-style paint brushes, such as BuTouch paint brush stylus made by Silstar, have been introduced to allow artists to "paint" on a touch-sensitive surface of a tablet and to mimic a brush. Such specialized stylus brush tips and paint brush styluses use conductivity-driven bristles for a capacitive stylus tip instead of a conventional rubber tip. However, such conventional stylus brush tips and paint brush stylus rely on the touch sensitivity of the tablet screen and the ability of the software to recreate paint-like brush strokes based on the touch sensitivity of the screen and fail to provide a controlled randomness of a paint brush hitting and moving across a canvas that traditional paint media allows.

SUMMARY OF THE INVENTION

There is a need for digital artists to recreate the feel and effects of using traditional paint tools and media by introducing more controlled randomness in their artistic process. Such controlled randomness, such as when a paint brush contacts a canvas, creates second and third order details that give character and a unique personal style to each painting based on the artist's skills. In addition, it is desirable for digital artists to be able to create more and more sophisticated and refined results as their skill levels and mastery of the medium increase. This ability is lacking in today's available input methods, such as stylus inputs, and conventional digital inputs tend to coerce the dexterity of an artist into a less sophisticated input.

The present invention recreates the variety and smooth feeling of a traditional paint brush in a digital environment and provides a digital paint brush that allows capture of brush strokes based on an analog to digital capture method. In some embodiments, the present invention captures the shape of the paint brush hair on a digital tablet or on another surface to create new and different input shapes corresponding to its shape and based on a variety of additional factors. The present invention also enables artists to use the digital paint brush for expressive movements, like dabbing and dragging, similar to traditional pain media. The present invention also provides processing methods and tools for interacting with the digital paint brush to provide a realistic painting experience for the artist. Furthermore, machine learning and AI implementations are provided in the present invention to enable accurate identification of the paint brush shape, generation of irregularities of the brush hair to add grain and to improve realism and fidelity of the brush hair outline, simulation of paint and mixing of colors, and simulation of brush hair behavior and mechanics.

In accordance with the present invention, a digital paint brush is provided comprising a handle including a housing for housing one or more electronic components, a painting tip attached to the handle, and at least one image capture apparatus including an image sensor configured to capture one or more images of the painting tip. In certain embodiments, the at least one image capture apparatus is positioned on the handle such that a field of view of the at least one image capture apparatus includes the painting tip. In some embodiments, the digital paint brush includes a plurality of image capture apparatuses positioned around a circumference of the handle.

In some embodiments, the digital paint brush includes at least one processor configured to control the at least one image capture apparatus to capture one or more images of the painting tip. In some embodiments, the digital paint brush is configured to communicate with an external electronic device, and the at least one processor is configured to control transmission of one or more images captured by the at least one image capture apparatus to the external device. In some embodiments, the one or more electronic components include a communication interface configured to transmit and receive data from an external electronic device.

In some embodiments, the painting tip of the digital paint brush comprises a plurality of strands formed from conductive material. The painting tip may be detachable from the handle and interchangeable with one or more other painting tips.

In some embodiments, the digital paint brush includes one or more of (a) a motion sensor configured to sense movement of the digital paint brush, and (b) a pressure sensor configured to sense application of pressure to the painting tip.

The present invention also provides a computer-implemented system for generating digitally painted images using a digital paint brush, with the system comprising at least one processor and a memory storing instructions executable by the at least one processor to control obtaining one or more images including a painting tip of the digital paint brush in contact with an input surface, perform processing on the obtained one or more images to determine a shape of the painting tip in contact with the input surface, and generate a digitally painted image based on the determined shape of the painting tip. In certain embodiments, the computer-implemented system further comprises a communication interface configured to communicate with the digital paint brush, and the at least one processor controls obtaining the one or more images from the digital paint brush.

In certain embodiments, the at least one processor of the computer-implemented system performs processing on the received one or more images using image segmentation to determine the shape of the painting tip. Image segmentation may be performed by the at least one processor by executing a trained image segmentation neural network model to perform the image segmentation. In some embodiments, the at least one processor performs the image segmentation by (a) applying one or more first transformations to the obtained one or more images to generate one or more modified images; (b) performing a series of convolutional operations to extract features from the one or more modified images and to generate a feature map; and (c) applying one or more second transformations to the generated feature map to obtain a region of interest in the one of more images, wherein the region of interest corresponds to the shape of the painting tip. The one or more first transformations may include one or more of resizing and normalizing the obtained one or more images, and the one or more second transformations may include one or more of upsampling the feature map, adding skip connections to the feature map to generate a merged feature map, transforming the feature map into a probability distribution over a plurality of classes, and applying a thresholding algorithm to the feature map.

In certain embodiments of the computer-implemented system, the at least one processor controls obtaining a plurality of images of the painting tip captured from different angles of view, the at least one processor further obtains one or more depth maps based on the obtained plurality of images, each of the one or more depth maps indicating a distance between a sensor and the painting tip, and the at least one processor perform processing on the obtained plurality of images based the one or more depth maps to determine a 3-dimensional shape of the painting tip in contact with the input surface. In some embodiments, the at least one processor performs processing on the received plurality of images by executing a sensor fusion algorithm. In some embodiments, a plurality of depth maps are obtained by the at least one processor, and the at least one processor executes the sensor fusion algorithm by (a) applying one or more transformations to the plurality of depth maps to generate a plurality of modified depth maps; (b) combining the plurality of modified depth maps to generate a fused depth map; and (c) generating a 3-dimensional surface model of the painting tip based on the generated fused depth map. The at least one processor performs processing on the obtained plurality of images based on the 3-dimensional surface model of the painting tip to determine the 3-dimensional shape of the painting tip in contact with the input surface.

In certain embodiments, the computer-implemented system further comprises a trained neural network model stored in the memory and executable by the at least one processor to perform stable diffusion processing on the generated shape of the painting tip in contact with the input surface to reconstruct details of individual strands in the painting tip and to output a modified shape of the painting tip. In certain embodiments, the trained neural network model executed by the at least one processor is configured to add noise in a predetermined area of the generated shape of the painting tip and to convert the added noise to details of the individual hair strands in the painting tip to output the modified shape of the painting tip. The predetermined area of the generated shape is a peripheral outline area of the generated shape.

In certain embodiments, the computer-implemented system further comprises a trained stable diffusion neural network model stored in the memory and executable by the at least one processor configured to simulate paint mixing and painting strokes by the painting tip, wherein, when the at least one processor executes the trained stable diffusion neural network model, the at least one processor generates a modified digitally painted image based on an input digitally painted image, new paint color information and painting tip movement information. In some embodiments, the painting tip movement information includes a trajectory of the painting tip on the input surface and velocity of the painting tip on the input surface, and the at least one processor adds noise to the input digitally painted image based on the trajectory of the painting tip, and progressively removes the added noise based on the trajectory, velocity and the new paint color information to output the modified digitally painted image.

The present invention also provides a computer-implemented system for generating digitally painted images using a digital paint brush including a handle and a painting tip, the system comprising: at least one processor and a memory storing instructions executable by the at least one processor to: execute a painting tip physics simulation model configured to simulate a path of the painting tip based on one or more physical properties of the painting tip and at least one of a trajectory of the painting tip on an input surface and pressure applied to the painting tip in contact with the input surface; and generate a digitally painted image based on the simulated path of the painting tip. In certain embodiments, the painting tip includes a plurality of strands and the one or more physical properties of the painting tip include one or more of length, thickness and stiffness of the plurality of strands. In some embodiments, the at least one processor executing the painting tip physics simulation model is configured to determine deformation of the painting tip when the painting tip is in contact with the input surface based on the physical properties of the painting tip, the trajectory of the painting tip on the input surface and the pressure applied to the painting tip in contact with the input surface, and to simulate the path of the painting tip based on the deformation of the painting tip.

The present invention also provides for computer-implemented methods for generating digitally painted images using a digital paint brush that convey the richness and randomness of painting on a physical medium. These methods are described in more detail below.

BRIEF DESCRIPTION OF THE DRAWINGS

The above and other features and aspects of the present invention will become more apparent upon reading the following detailed description in conjunction with the accompanying drawings, in which:

FIGS. 2A-2D show an overall configuration of the digital paint brush;

DETAILED DESCRIPTION

The present invention is directed to a digital paint brush that looks and feels like a traditional artist paint brush with a handle and hair and includes built-in electronics for capturing an analog input by the paint brush. The paint brush is wireless and portable and can be used by an artist on a digital screen or on any canvas or non-digital, non-electronic input surface, e.g., a wall, to create paintings in a similar fashion as with traditional paint and paint brush. In certain embodiments, the brush hair of the digital paint brush is made from a special conductive material that enables the digital paint brush to work with digital input displays or surfaces such as touchscreens or tablets, including iPads. As discussed in more detail below, the digital paint brush of certain embodiments includes one or more cameras configured to capture images of the paint brush hair which are then used by an external device with at least one processor or CPU executing a computer-implemented process to perform computer vision algorithms using image segmentation and/or sensor fusion techniques to obtain a 2-dimensional or a 3-dimensional shape of the paint brush hair, to simulate behavior of paint brush hair, and to execute inpainting processes to reconstruct the details of the brush hair. These functionalities allow the at least one processor or CPU of an external device to generate and output for display an image (hereinafter a "painted image") that realistically represents painting strokes performed by the user of the digital paint brush. In addition, the present invention provides a computer-implemented paint simulation and mixing process based on machine learning which enables realistic digital simulation of paint behavior and paint disturbances, including color mixing and paint splatters. This functionality allows the external device to accurately capture mixing of paint colors when the digital paint brush is used for mixing different paint colors and to generate the painted image with realistic color mixes similar in appearance to traditional painting in the real world, i.e., analog painting with paint.

Figure 1A:
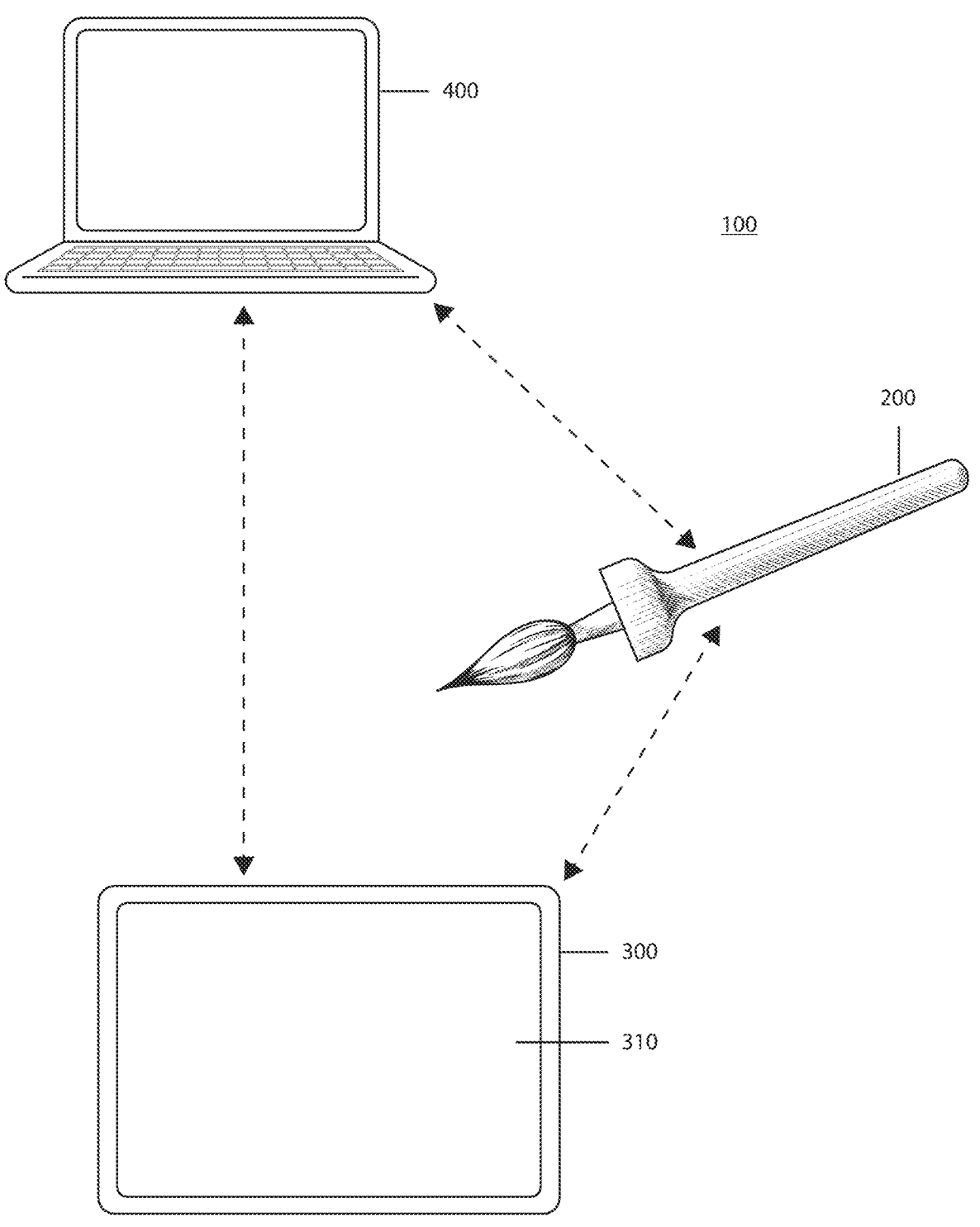
FIGS. 1A-1B show an overall computer-implemented paint system including a digital paint brush and communications among system components.
Figure 1B:
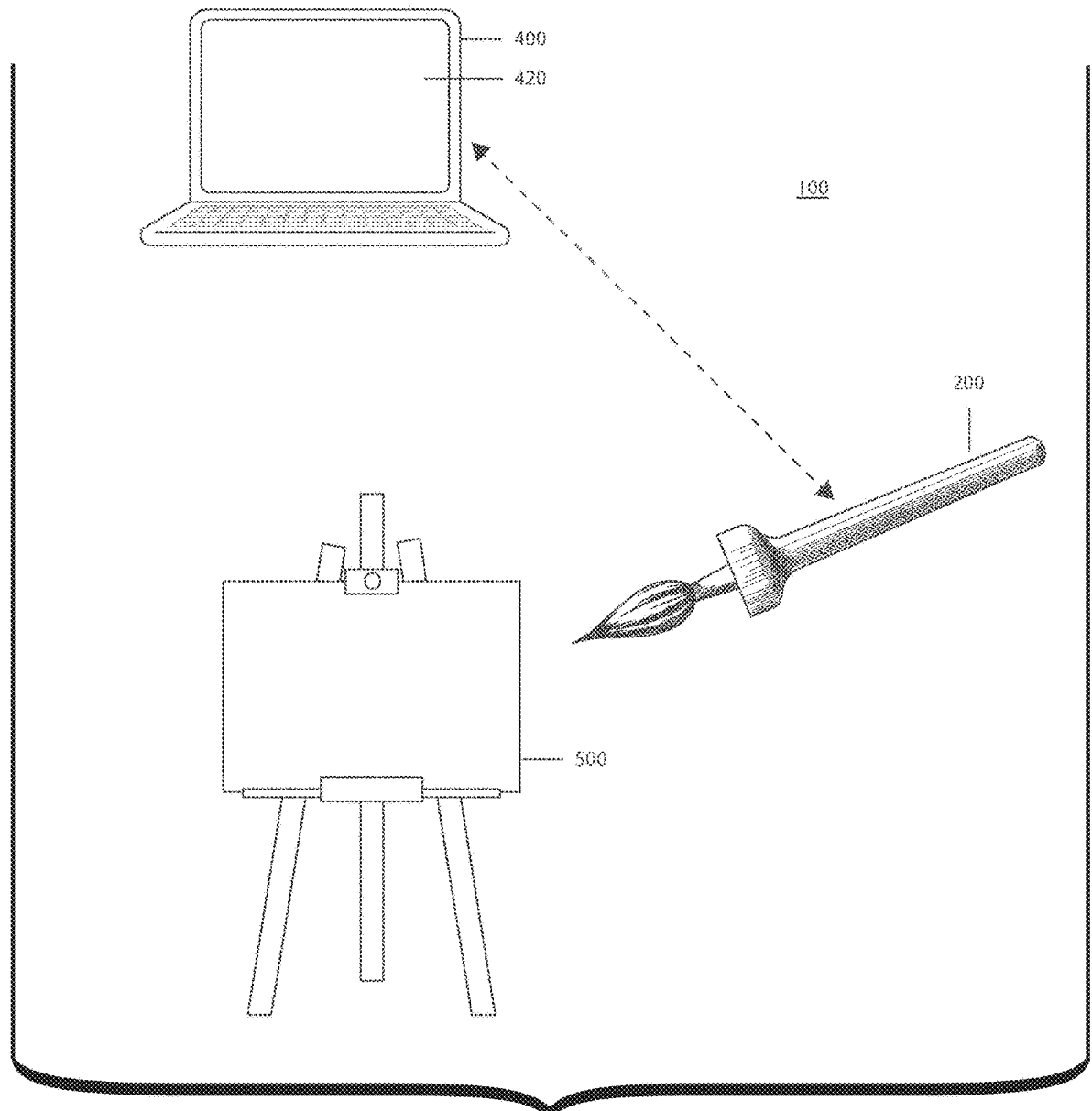

FIGS. 1A and 1B show exemplary overall digital painting systems 100 that include a digital paint brush 200 of the present invention, an input surface used for painting thereon and at least one processor or CPU. In FIG. 1A, the system 100 includes a portable electronic device 300, such as a tablet, a smart phone or a touchscreen, with a display screen 310 as the input surface, and in some embodiments, the system 100 optionally includes an external processing device 400, such as a computer, a server, etc. Each of the digital paint brush 200, the electronic device 300 and the external processing device 400 includes a communication interface for communicating data and signals with other devices in the system 100 by one or more communication methods, such as by at least one wireless communication method. The communication interfaces allow the digital paint brush 200, the electronic device 300 and/or the external processing device 400 to wirelessly send and receive communications from one another using any suitable communication protocol, including but not limited to Bluetooth®, Near Field Communication, Wi-Fi, RFID, cellular communication, etc.

In certain embodiments, the display screen 310 of the portable electronic device 300 is a touch-sensitive display screen (touchscreen) capable of receiving touch inputs from the digital paint brush 200 and configured to display a painted image based on the touch inputs from the digital paint brush 200. In certain embodiments, the portable electronic device 300 includes at least one processor or CPU and a memory configured to process the touch inputs on the display and data received from the digital paint brush and to generate and output the painted image based on the processed inputs and data. In some embodiments, the external processing device 400 includes at least one processor or CPU and a memory configured to perform some or all of the processing based on the touch inputs and the data from the digital paint brush and may generate and output a painted image to the portable electronic device 300 for display on the display screen 310. In other embodiments, the external processing device 400 is used for performing machine learning functions to train certain image processing modules and algorithms, while in yet other embodiments, the portable electronic device 300 performs some or all of the machine learning functions. In some embodiments, the external processing device 400 may include an input screen, such as a touchscreen, that can receive touch inputs from the digital paint brush 200.

In an exemplary embodiment of the system shown in FIG. 1A, the system 100 includes the digital paint brush 200 and a tablet 300, such as an iPad tablet. The digital paint brush 200 is connected to and communicates with the tablet 300 using a custom web socket web server for low latency and real-time streaming of data. The digital paint brush 200 and the tablet 300 connect to the web server, which creates a two-way communication channel between these two devices. The tablet 300 runs a custom painting software, which includes one or more of the trained machine learning modules described herein below and which is capable of interpreting the events coming from the digital paint brush 200 and to render correct shape and color of painting strokes by the digital paint brush 200 so as to output a painted image. A custom paint brush API may be used for allowing existing painting software to interact with the digital paint brush 200 and to provide integration of any painting software on the tablet 300.

In FIG. 1B, the system 100 includes the digital paint brush 200, similar to the one in FIG. 1A and a processing device 400, which can be a computer, a server, a tablet, a smart phone, etc. and which includes at least one processor or CPU and a memory. Each of the digital brush 200 and the processing device 400 includes a communication interface that allows for communication between the digital paint brush 200 and the processing device 400. The communication interfaces allow the digital paint brush 200 and the processing device 400 to wirelessly send and receive communications from one another using any suitable communication protocol, including but not limited to Bluetooth®, Near Field Communication, Wi-Fi, RFID, cellular communication, etc. In the embodiment of FIG. 1B, the input surface 500 can be any physical input surface, such as a canvas, a screen, a window, a wall, 3-dimensional object, statue, etc. The input surface 500 in this embodiment is not required to have a touchscreen capability and is not required to have any electronic components. In the embodiment of FIG. 1B, the digital paint brush 200 communicates the necessary data to the processing device 400, including, but not limited to, data regarding speed/velocity, direction and orientation of the digital paint brush 200, pressure applied to brush hairs of the paint brush 200 when the brush hairs touch the input surface, image(s) of the paint brush hair, and other information, and the processor or CPU of the processing device 400 processes the data received from the digital paint brush 200 to generate a painted image, which can be output to a display 420 of the processing device 400 or can be communicated to another device.

Figure 1C:
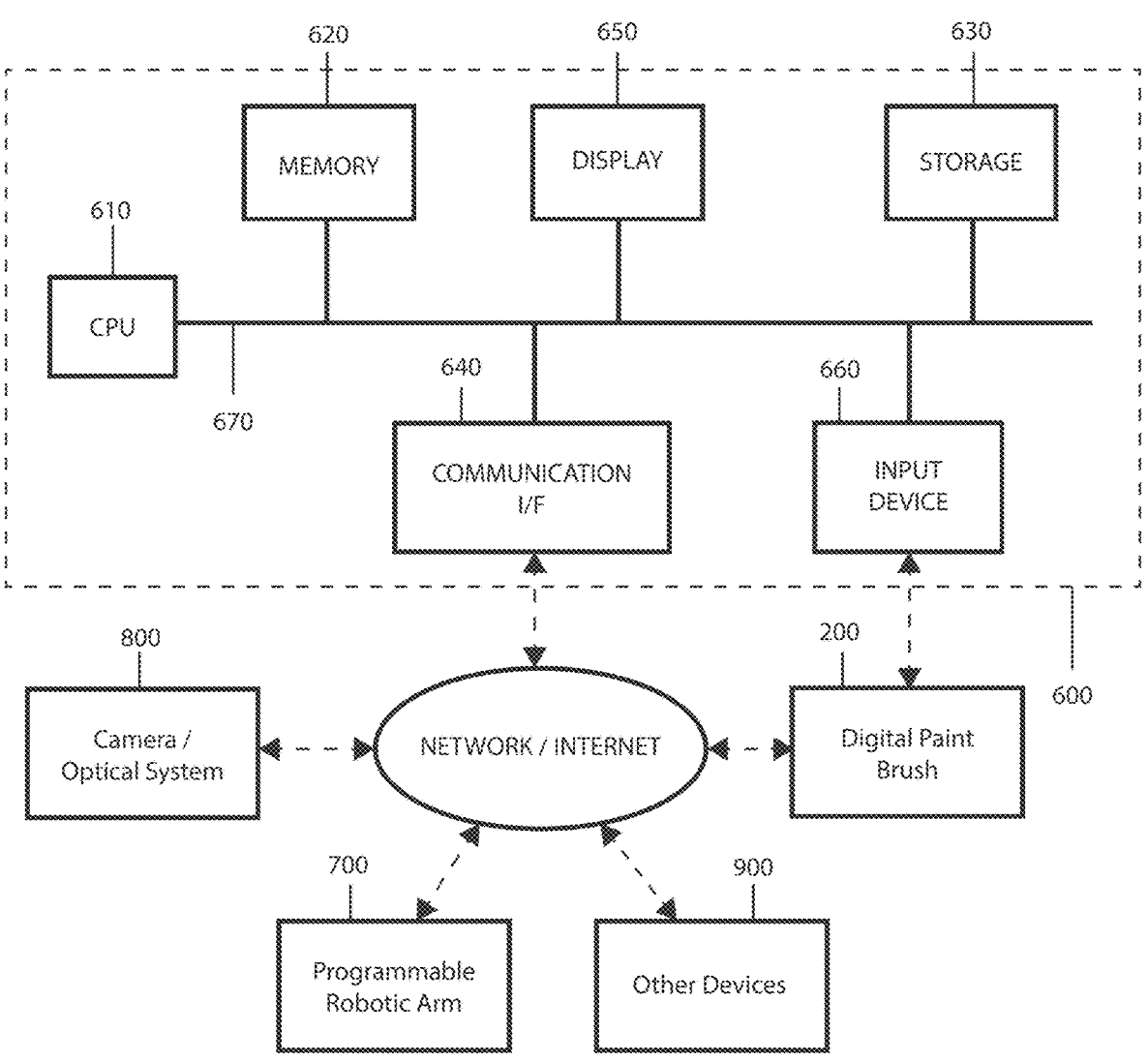
FIG. 1C schematically shows the system including an external device and the digital paint brush.

FIG. 1C schematically shows an exemplary configuration of an external device 600, which can be the portable electronic device 300 and/or the processing device 400 shown in FIGS. 1A and 1B, and the external device's communication connections with the digital paint brush 200 and other components that may be used with and connected to the system. The external device 600 may be used for receiving data, including image data, from the digital paint brush 200 and executing a computer vision algorithm to analyze received data using image segmentation and in some embodiments, performing sensor fusion to merge image data and depth information, so as to determine and render the shape of the paint brush hair of the painting tip as described in more detail below. The external device 600 may also execute other algorithms for further refinements, including adding grain or irregularities to the shape of the paint brush hair and simulating brush hair physics. The external device 600 may also execute paint mixing algorithms for realistic mixing of colors.

Furthermore, in certain embodiments, the external device 600 executes a machine learning model to train and evaluate an image segmentation deep neural network, to train and evaluate a neural network to convert noise in brush hair images into high-resolution paint brush images and to reconstruct the details of brush hair, to train and evaluate a neural network to simulate and predict the behavior of brush hair, and/or to train and evaluate a neural network to simulate paint mixing. These machine learning processes are described in more detail below.

As shown in FIG. 1C, the external device 600 includes at least one processor or CPU 610, a memory 620, a storage device 630 and a communication interface 640. In certain embodiments, the external device 600 includes a display 650 and one or more input devices 660, such as a touchscreen, a keyboard, a mouse, etc. These components are connected by one or more buses 670. In some embodiments, the display 650 and the input device 660 may be the same touchscreen component. In certain embodiments, the display 650 and/or input device 660 may be separate and distinct from the external device 600 and may be connected to the external device using any suitable wired or wireless connection, e.g., LAN, WAN, Wi-Fi, Bluetooth®, NFC, Internet, etc.

The at least one processor or CPU 610 controls the operations of the other components of the device 600 and executes software, algorithms and machine learning modules stored in a memory 620 and/or accessed by the memory 620. The communication interface (I/F) 640 is configured to transmit and receive data from other devices, including the digital paint brush 200. As shown in FIG. 1C, the communication interface 640 is configured to transmit and receive data via a network and/or via the Internet so as to communicate with devices such as the digital paint brush 200, a programmable robotic arm 700 described in more detail below, one or more cameras with an optical system 800 and/or other devices 900 connected to the network. In certain embodiments, the communication interface 640 enables direct communication with the digital paint brush 200, such as by using Bluetooth® or NFC or similar connections or by wired communication. Moreover, in certain embodiments, the digital paint brush 200 interacts with the input device 660, e.g., a touchscreen, of the external device 600 causing transmission of signals, such as signals indicating a touch event or a touch-up operation.

Figure 1D:
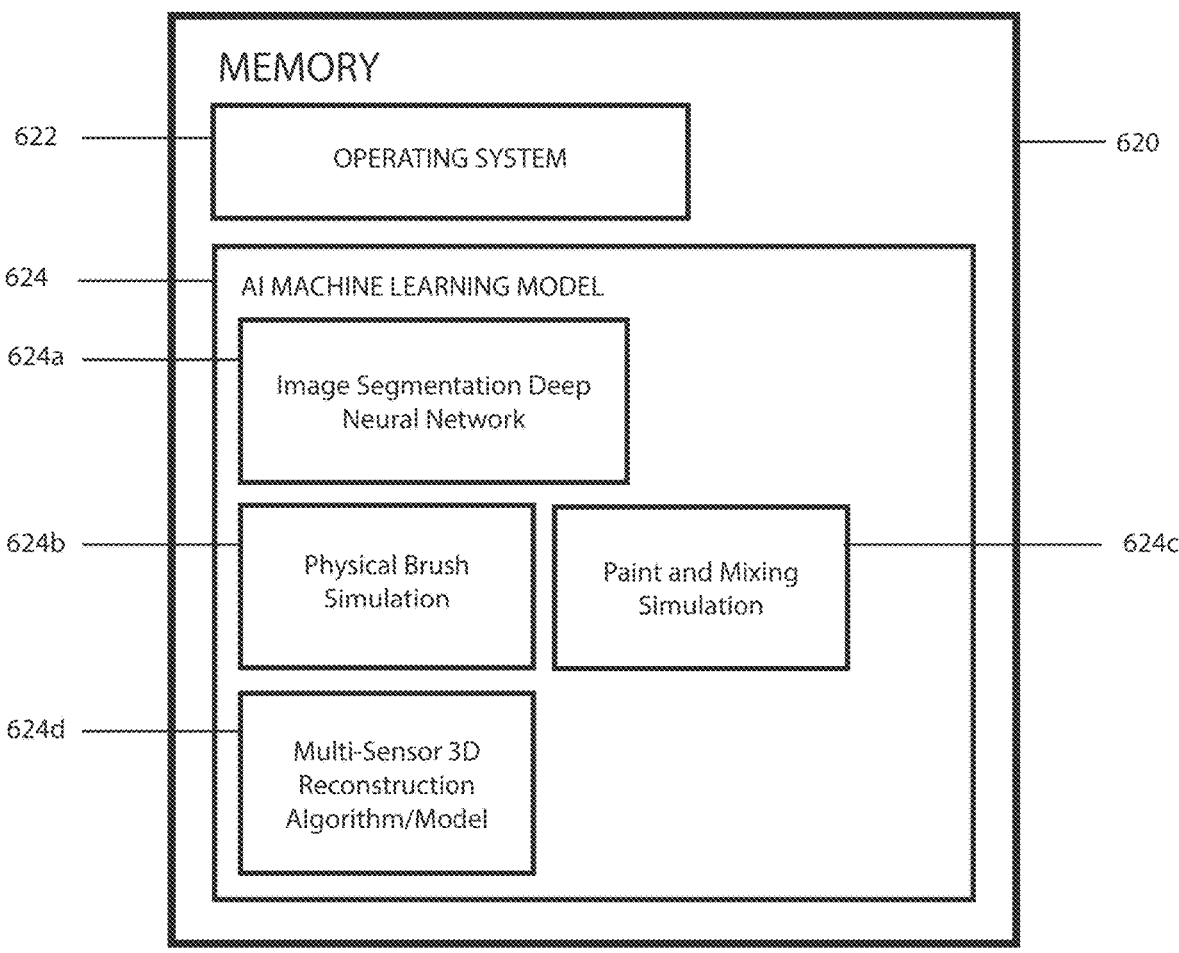
FIG. 1D shows a non-transitory storage medium of the external device of FIG. 1C.

FIG. 1D schematically shows the memory 620 of the external device, which stores thereon a number of models and algorithms executed by the at least one processor or CPU 610 when the digital paint brush 200 is used for painting. As shown, the memory 620 stores thereon an operating system 622 and an artificial intelligence (AI) machine learning model 624. The machine learning model 624 includes an image segmentation deep neural network 624a, which is trained and evaluated to perform image segmentation to generate an outline or shape of a painting tip of the digital paint brush 200, e.g., paint brush hair, as described in more detail below. A physical brush simulation model 624b is trained and evaluated to perform a simulation of paint brush hair behavior under certain conditions as described in more detail below. The machine learning model 624 further includes a paint and mixing simulation model 624c which is trained and evaluated to perform a simulation of mixing paint and paint brush strokes when applying paint and mixing paint as described in more detail below. In addition, the machine learning model includes a multi-sensor 3D reconstruction algorithm or trained model 624d, which when executed by the at least one processor or CPU 610, merges image data of the painting tip received from multiple sensors and generates a 3-dimensional reconstruction of the painting tip. These models 624a-d are described in more detail below.

Figure 2D:
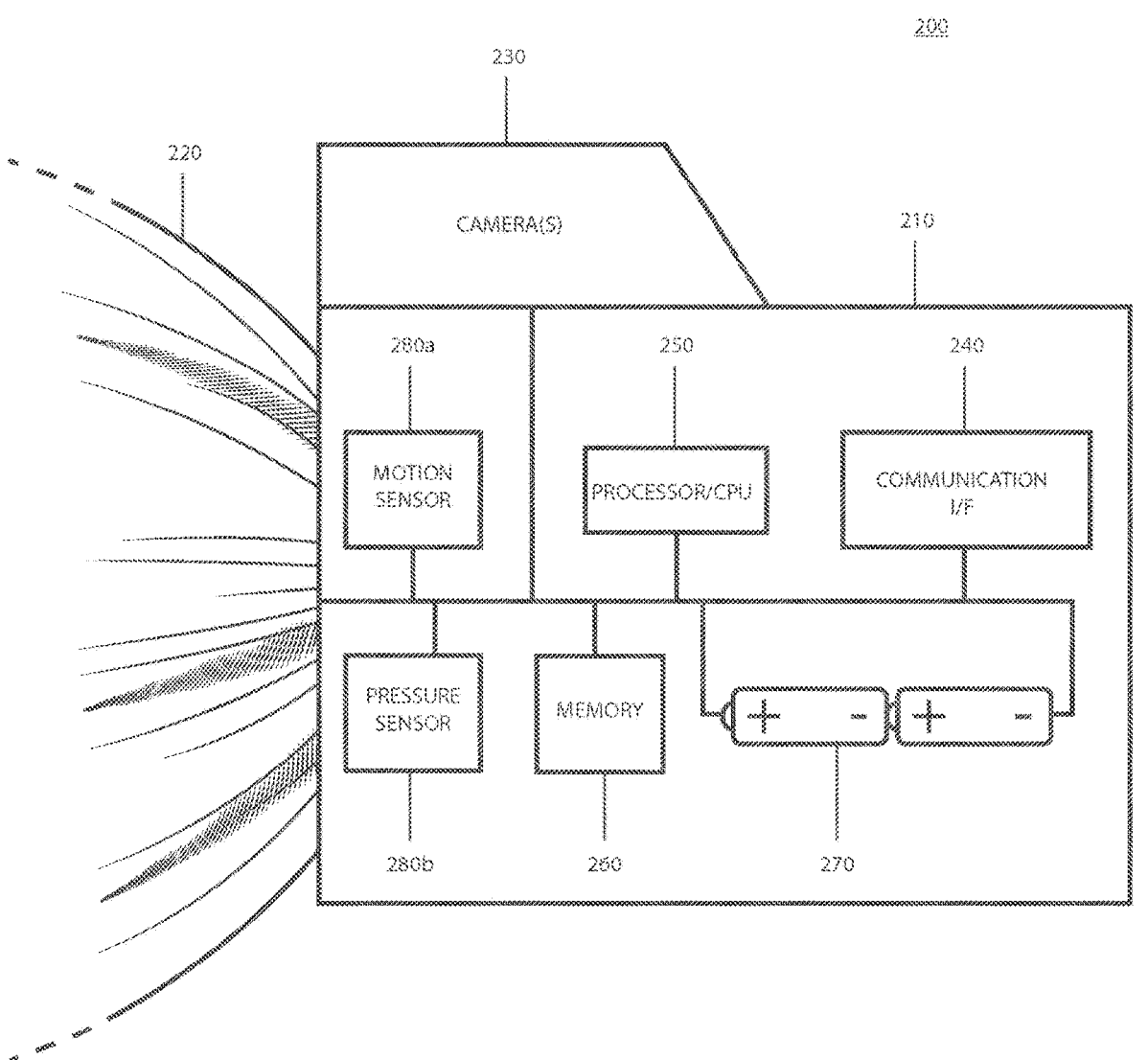

FIGS. 2A-4B show illustrative embodiments of the digital paint brush 200 in accordance with the present invention. FIGS. 2A-2D show a general embodiment of the digital paint brush 200 of the present invention. As shown in FIG. 2A, the digital paint brush 200 includes a handle 210 and a painting tip 220. In certain embodiments, the painting tip 220 comprises capacitive hair material, including a plurality of strands, attached to the handle 210 that enables a touchscreen to sense the painting tip 220 when it comes in contact with the touchscreen. In some embodiments, the painting tip 220 may be formed from non-capacitive hair or from other materials, such as foam or sponge. The foam or sponge materials may be formed from capacitive or non-capacitive materials. Moreover, in some embodiments, the painting tip may be in the shape of a roller or another shape, formed from capacitive or non-capacitive materials. In certain embodiments, the painting tip 220 may be removably attached to the handle and may be interchangeable with other types of painting tips, such as painting tips having different shapes, sizes, hair lengths, hair density, etc.

The handle 210 houses therein and/or has embedded therein, electronic components of the digital paint brush 200. FIG. 2D shows a schematic view of the digital paint brush

200 and its internal components. The positioning and arrangement of the components within the handle 210 are illustrative and can be varied. The electronic components include, but are not limited to, one or more sensors 280*a*, 280*b*, a communication interface 240, one or more processors 250, a memory 260, one or more power sources 270, and other electronics. The one or more sensors may include one or more gyro sensors 280*a* and/or other sensors for sensing orientation and/or motion of the paint brush during use, and/or one or more pressure sensors 280*b* for sensing pressure applied to the painting tip and/or pressure applied by the painting tip to the input surface. In certain embodiments, the handle also houses one or more image sensors and one or more optical components, e.g., lens(es), of one or more camera(s) 230 for capturing images of the painting tip 220. Miniaturized cameras with sufficiently low latency are suitable for use in the paint brush. An exemplary camera is a miniature webcam which allows image requests within 5 ms, has a resolution of 1024×1280 and has a smartphone type image sensor. Other types of miniature cameras can be used in the digital paint brush.

The communication interface 240 enables the digital paint brush 200 to communicate with an external device, such as the portable electronic device 300 and/or the external processing device 400 described above with respect to FIGS. 1A-1B. The one or more processors 250 control the overall operation of the electronic components and communication with an external device, and may also perform select processing based on signals/data received from one or more sensors 280*a*, 280*b* and images captured by the one or more cameras 230.

In some embodiments, some or all of the electronic components and image capturing components are housed in the handle 210 closer to a proximal end of the handle (and closer to the painting tip 220) than to a distal end of the handle 210. As described in more detail below, in certain embodiments, the optical components of the camera(s) 230 are housed in the handle at a predetermined distance from the painting tip so as to capture images of the painting tip 220 at predefined angles of view. It is preferred that the electrical components are housed within the handle so as to create a compact structure that does not interfere with the user's view of the input surface and of the painting tip and does not interfere with painting by the user.

FIGS. 2B and 2C show side and top views, respectively, of the painting tip 220 of the paint brush 200 of FIG. 2A. In FIGS. 2B and 2C, contact surface between the painting tip 220 and the input device, e.g., touchscreen, is highlighted in gray. In a touchscreen input device, such as a tablet 300 of FIG. 1A, the contact surface and its shape are sensed by the touchscreen and are used in the processing performed by the CPU of the tablet and/or the CPU of the external processing device when generating a painted image on the display of the touchscreen. In other embodiments described above, the shape of the painting tip in contact with the touchscreen and/or other input surface are determined by the at least one processor or CPU of the tablet 300 or the external processing device 400, or by the at least one processor or CPU of the paint brush 200 based on the images captured by the at least one camera 230 of the digital paint brush 200.

Figure 3:
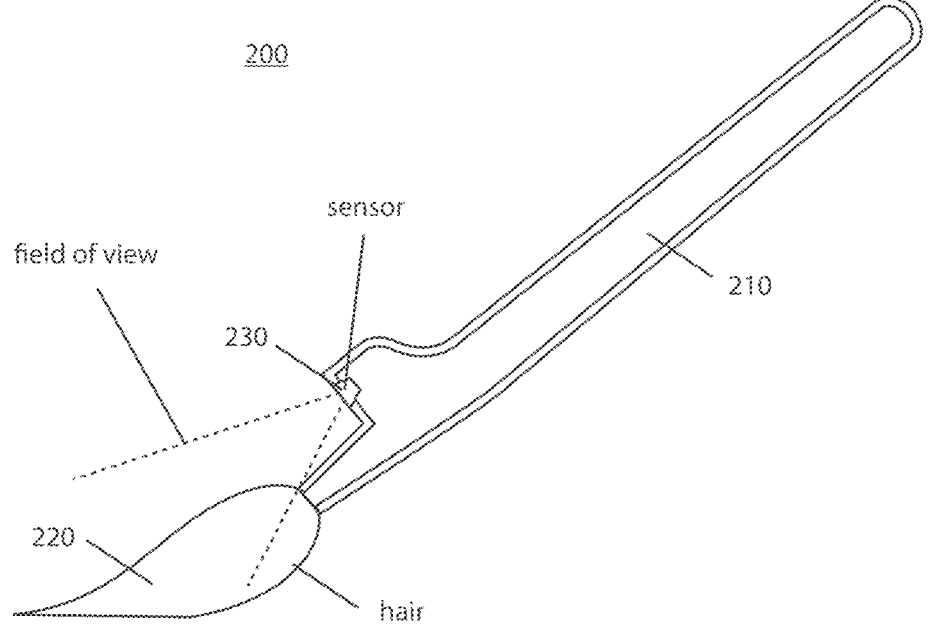
FIG. 3 shows a first embodiment of the digital paint brush.

FIG. 3 shows an exemplary embodiment of the digital paint brush 200 of FIG. 2 which includes a single camera 230 with one or more image sensors and one or more optical components, e.g., lenses, held by, embedded into or otherwise attached to the handle 220 of the digital paint brush 200. The camera 230 is positioned at a predetermined distance from the proximal tip of the handle and oriented so that the entire length or substantially the entire length of the exposed painting tip hair is within the field of view of the camera, as shown in FIG. 3. This positioning of the camera 230 allows images of the painting tip 220, and of the hair strands of the painting tip 220, to be captured by the camera at an angle. When the digital paint brush 200 of FIG. 3 is used by a user, the camera 230 captures one or more images of the painting tip hair which are then used by an algorithm, such as a computer vision algorithm, stored on a non-transitory computer-readable medium and executed by one or more processors or CPU to determine the shape of the painting tip 220 during use and to generate a painted image based on the shape of the painting tip 220. Although the illustrative embodiments described herein focus on the painting tip 220 formed from hair materials, it is understood that these embodiments may be applied to other types of painting tips, such as those with foam, sponge or roller-shaped painting tips.

Figure 5:
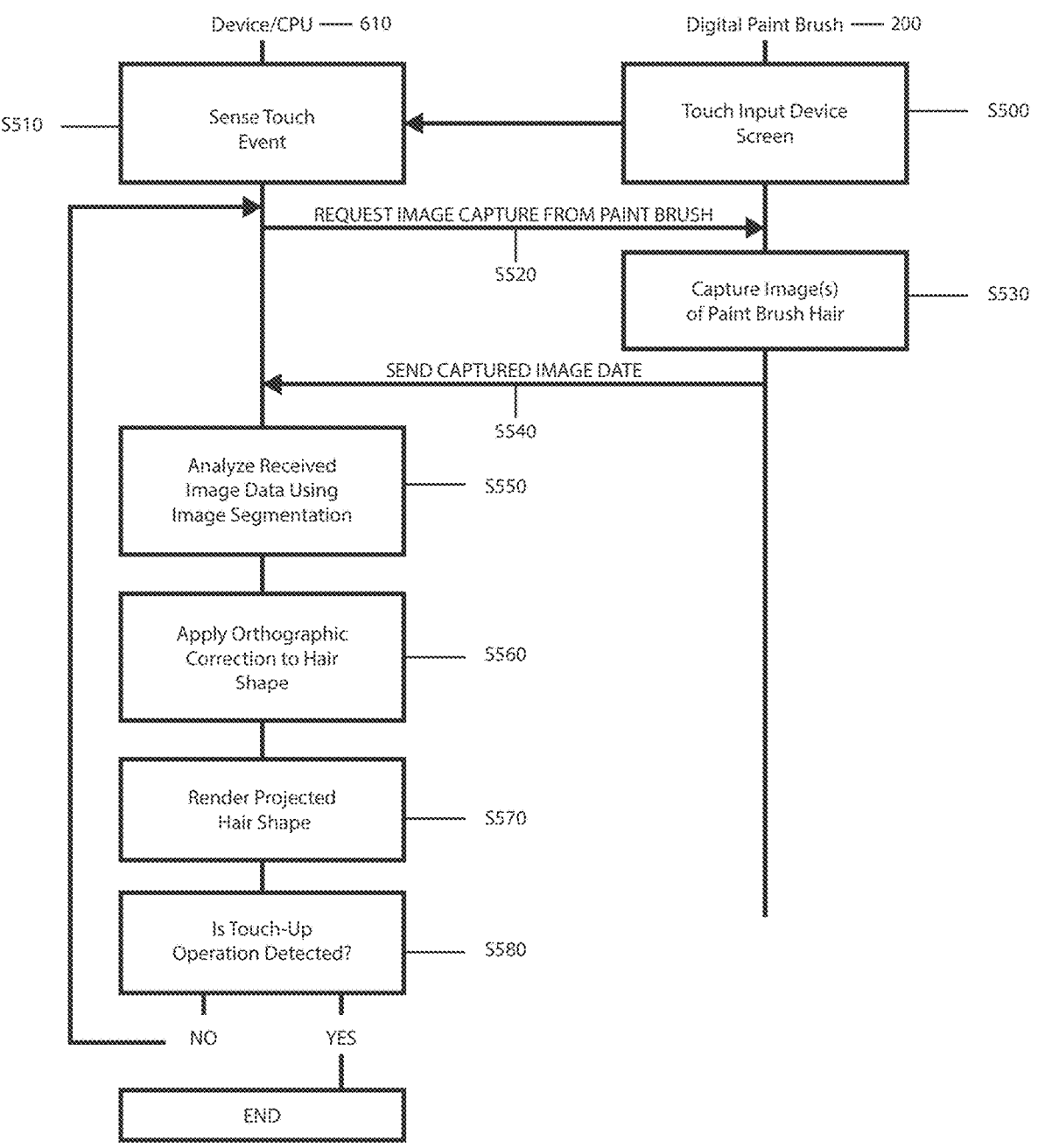
FIG. 5 shows an exemplary communication and processing flow between the CPU and the digital paint brush of FIG. 3.

An exemplary process performed by the one or more processors or CPU 610 and the digital paint brush 200 of FIG. 3 is shown in FIG. 5. The one or more processors or CPU 610 is part of the external device 600 shown in FIG. 1C, which can be a tablet or other portable device (300 in FIG. 1A) or part of the processing device (400 in FIGS. 1A-1B), and which is configured to execute the computer vision algorithm. As shown in FIG. 5, when the capacitive material of the painting tip 220 comes into contact with the touchscreen of the device 600 in Step S500, the contact is sensed by the touchscreen and a touch event is triggered by the one or more processors or CPU 610 of the device in Step S510. Upon the activation of the touch event, the device 600 sends a request to the digital paint brush with a request to capture an image of the painting tip in Step S520. The request to the digital paint brush 200 is sent by the communication interface 640 of the device 600 through a network, e.g., internet, LAN, Wi-Fi, etc., or a direct wireless or wired connection with the digital paint brush 200, such as Bluetooth®, NFC, etc. In response to receiving the request to capture an image, the digital paint brush 200 captures an image using the camera 230 in Step S530 and transmits the captured image to the device in Step S540. The one or more processors or CPU of the device 600 then executes the computer vision algorithm to analyze the received image using an image segmentation technique in Step S550 to obtain the shape of the painting tip hair as captured by the camera. Details of an image segmentation deep neural network and a processes of creating a trained image segmentation model are described below with reference to FIGS. 8-10.

In Step S560, orthographic correction is applied by the one or more processors or CPU to the obtained shape of the painting tip hair in order to project the shape of the hair to a flat surface of the display (e.g., touchscreen and/or other display), and in step S570, the projected shape of the painting tip corresponding to the shape of the painting tip hair in contact with the touchscreen is rendered by the painting software being executed by the one or more processors or CPU and displayed on the display.

The process of FIG. 5 is repeated while the painting tip of the digital paint brush is in contact with the touchscreen so as to render the painted image on the display. Specifically, after rendering the shape of the painting tip hair on the display, the CPU determines in step S580 whether a touch-up operation has been detected, i.e., whether the capacitive painting tip is no longer in contact with the touchscreen. If a touch-up operation of the painting tip has been detected (YES in step S580), then the process ends until a new touch event is triggered. However, if the CPU determines in step S580 that the painting tip is still in contact with the display (NO in step S580), then the processing returns to step S520 of the process and the process steps S520-S580 are repeated.

Figure 4A:
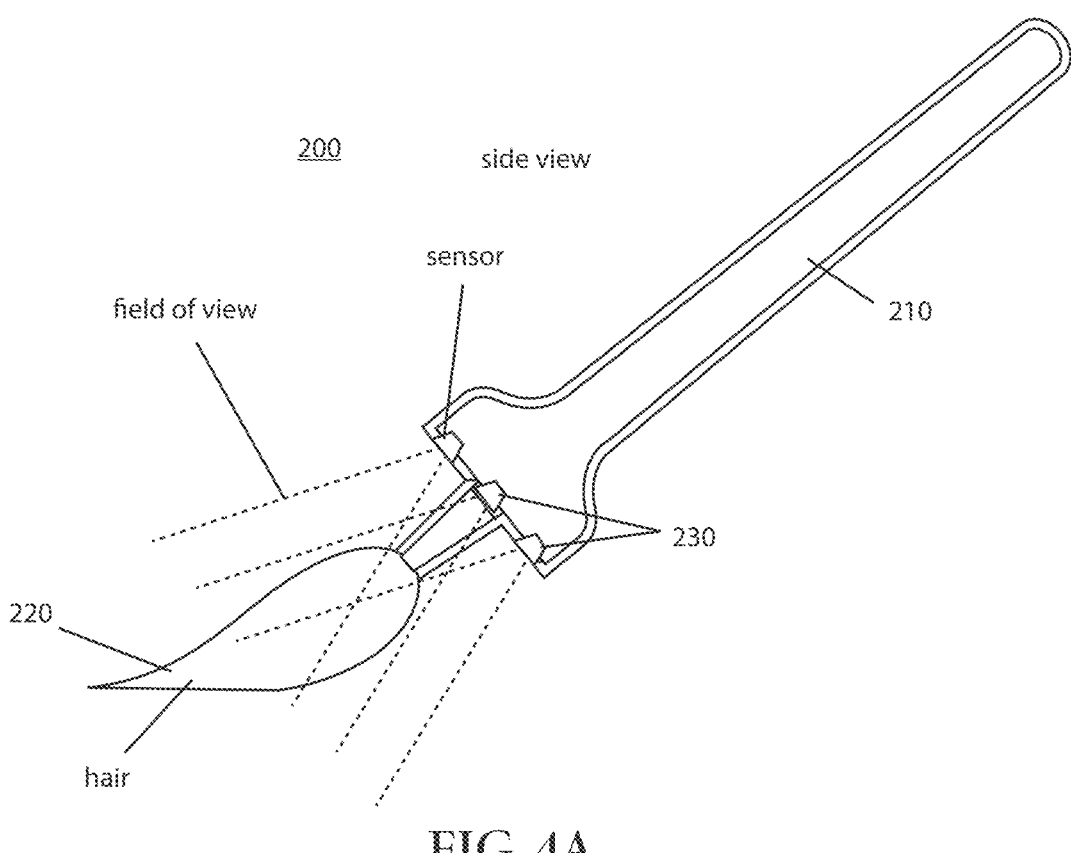
FIGS. 4A-4B show a second embodiment of the digital paint brush.
Figure 4B:
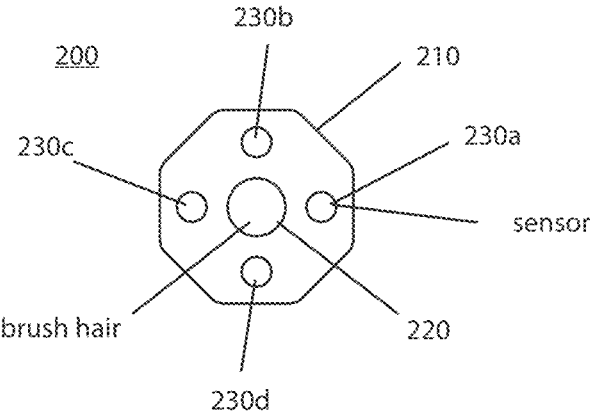

Another exemplary embodiment of the digital paint brush 200 is shown in FIGS. 4A and 4B. In this embodiment, the construction of the digital paint brush 200 is substantially similar to that of the digital paint brush 200 in FIG. 3, but instead of a single camera, the digital paint brush 200 of this embodiment includes multiple cameras 230, each including at least one image sensor and an optical system, disposed around the circumference of the handle 210. In the illustrative embodiment shown in FIGS. 4A and 4B, the digital paint brush 200 includes four cameras 230a-230d positioned around the handle at substantially equal intervals. It is understood that the number of cameras 230 may be different from the four cameras shown in FIGS. 4A and 4B, and that the positioning of the cameras 230 on the handle of the paint brush may also be different. In the embodiment of FIGS. 4A-4B, the number and positioning of the cameras allows the digital paint brush 200 to be used in any orientation and enables capturing of multiple images from different angles and generating or obtaining depth information based on the multiple captured images. As in the previous embodiment, the cameras 230a-d are provided at positions shifted away from the proximal end of the handle 210 so that the entire length or substantially the entire length of the painting tip 220 is within the field of view of each camera 230a-d. Although the cameras 230a-d are provided at substantially the same distance from the proximal end of the handle 210, in other embodiments, the cameras may be provided at different distances from the proximal end of the handle 210 so as to capture images with different fields of view at different distances from the painting tip 220.

Although FIGS. 4A-4B show a single painting tip being attached to the handle of the digital paint brush, it is understood that in some embodiments, the painting tip may be removable and interchangeable with other painting tips having a different shape, size, hair length, tip type, etc. In such embodiments, the detachment of the painting tip from the handle and attachment of a new painting tip to the handle may be notified to the external device 600 by transmitting one or more signals from the paint brush 200 to the external device 600. In some embodiments, information identifying the painting tip attached to the handle of the paint brush 200 or identifying characteristics of the painting attached to the handle, i.e., type, size, length, etc., may be communicated from the paint brush 200 to the external device 600.

Figure 6:
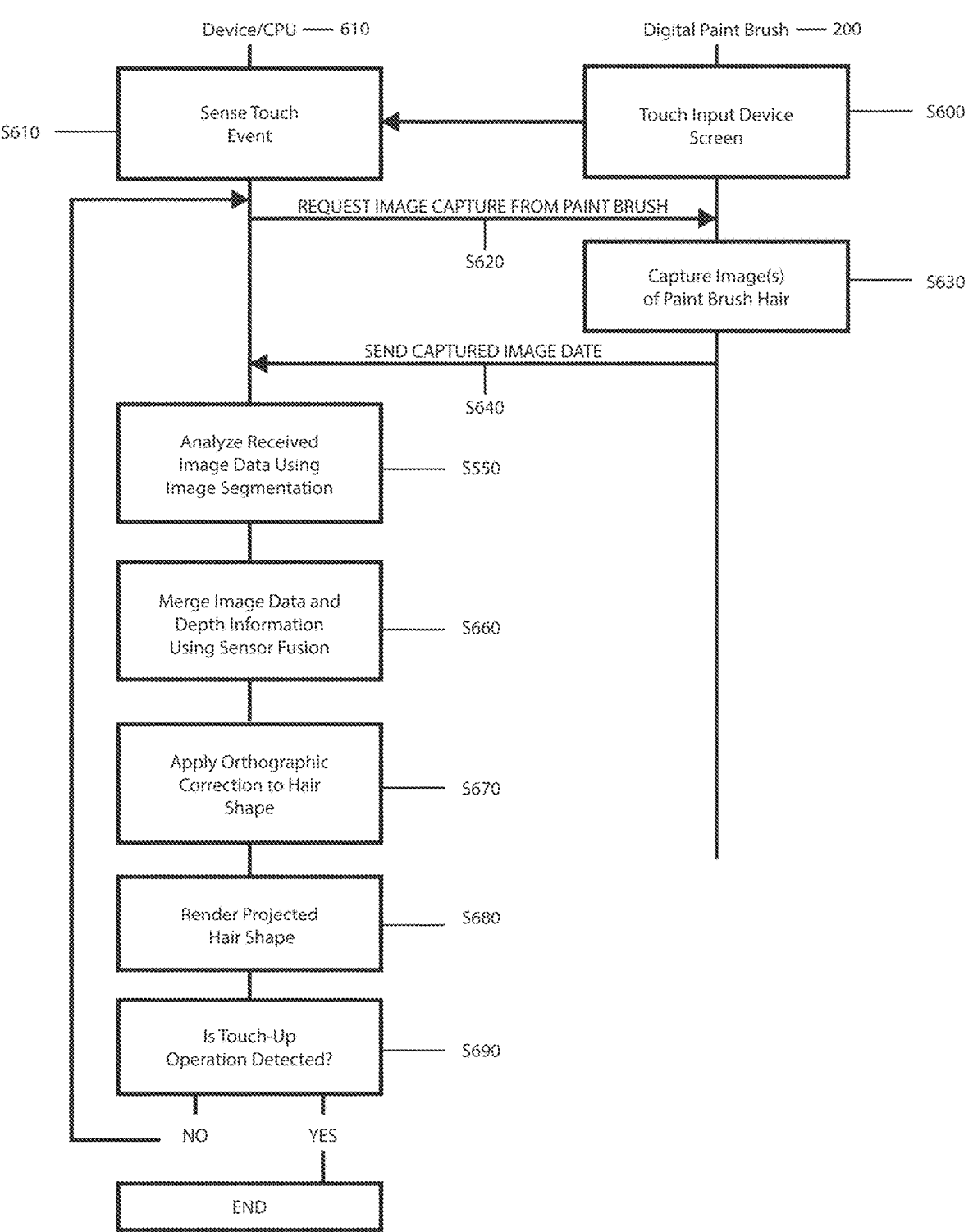
FIG. 6 shows an exemplary communication and processing flow between the CPU and the digital paint brush of FIGS. 4A-4B.

An exemplary process performed by the one or more processors or CPU 610 and the digital paint brush 200 of FIGS. 4A-4B is shown in FIG. 6. The one or more processors or CPU 610 is part of the external device 600 of FIG. 1C, which can be a tablet or other portable device (300 in FIG. 1A) or an external processing device (400 in FIGS. 1A-1B), and is configured to execute the computer vision algorithm. As shown in FIG. 6, when the capacitive material of the painting tip 220 comes into contact with the touchscreen of the device 600 in Step S600, the contact is sensed by the touchscreen and a touch event is triggered by the one or more processors or CPU of the device in Step S610. Upon the activation of the touch event, the device 600 sends a request to the digital paint brush with a request to capture at least one image of the painting tip in Step S620. In response to receiving the request to capture an image, the digital paint brush captures images using the four cameras 230a-d in Step S630 and transmits the captured images to the device 600 in Step S640.

The one or more processors or CPU of the device 600 then execute the computer vision algorithm to analyze the received images using the image segmentation technique in Step S650 to obtain the shape of the painting tip hair as captured by each of the cameras. In this step S650, image segmentation masks are computed corresponding to each of the camera angles using image segmentation. In addition, the one or more processors or CPU analyze some or all of the received images to obtain depth information of the painting tip hair. In step S660, the one or more processors or CPU merge the image data corresponding to the received images and the depth information using a sensor fusion process, such as depth fusion, to generate a 3-dimensional representation of the painting tip hair. Specifically, in step S660, the one or more processors or CPU use the image segmentation masks computed in step S650 and camera information of the four cameras 230a-d to perform a photogrammetric 3D computation to determine the 3-dimensional outline (shape) of the paint brush hair in a space. The camera information used by the one or more processors or CPU includes relative positions of the cameras 230a-d in a space around the painting tip and optical properties of camera lenses. The details of the sensor fusion process are described below with reference to FIG. 11.

In Step S670, orthographic correction is applied by the one or more processors or CPU to the obtained 3-dimensional shape of the painting tip hair in order to project the shape of the hair to a flat surface of the display (touchscreen or other display), and in step S680, the projected 3-dimensional shape of the painting tip corresponding to the shape of the painting tip hair in contact with the touchscreen is rendered by the painting software being executed by the one or more processors or CPU and displayed on the display.

The process of FIG. 6 is repeated while the digital paint brush is in contact with the display so as to render the painted image on the display. Specifically, after rendering the shape of the painting tip hair on the display, the one or more processors or CPU determine in step S690 whether a touch-up operation is detected, e.g., whether the capacitive painting tip is no longer in contact with the display. If a touch-up operation of the painting tip is detected (YES in step S690), then the process ends until a new touch event is triggered. However, if the CPU determines in step S690 that the painting tip is still in contact with the display (NO in step S690), then the processing returns to step S620 of the process and steps S620-S690 are repeated.

In certain embodiments of the process, depth information may be obtained by the one or more processors of the digital paint brush based on the captured images and then transmitted to the device 600 in association with the captured image data in step S640. In some processes, some or all of the camera information, including the relative camera positions and the optical characteristics of the camera lenses, is transmitted from the digital paint brush to the device 600 together with the image data, while in other embodiments this information is transmitted in advance or prestored in the device 600 in association with the digital paint brush information and can be accessed by the one or more processors or CPU of the device 600 when performing the photogrammetric 3D computations.

In certain embodiments, the process performed by the one or more processors or CPU 610 of the device 600 and the digital paint brush 200 of FIGS. 4A-4B may include additional refinements and calculations. In some embodiments, images captured from multiple different angles of view by the cameras 230a-d of the digital paint brush 200 allow the one or more processors or CPU to analyze a full 3-dimensional shape of the painting tip 220, including distortion of the paint brush hair due to pressure applied thereto. Based on this distortion of the paint brush hair and using a model of the paint brush hair based on solid and elasticity physics, the one or more processors or CPU 610 can determine pressure applied by the painting tip on the input surface, e.g., screen. Such determination of pressure applied by the painting tip and its applications are described in more detail herein below.

In yet other embodiments, the digital paint brush includes one or more pressure sensors 280b for sensing pressure applied to the painting tip and/or pressure applied by the painting tip to the input surface, e.g., touchscreen, display or non-electronic. In such embodiments, pressure information corresponding to the sensed pressure is transmitted from the digital paint brush 200 to the device 600. The one or more processors or CPU 610 of the device 600 may use the pressure information received from the digital paint brush 200 for the additional applications described below or may use a combination of this received pressure information and the calculated pressure.

As discussed above with respect to FIG. 1B, the digital paint brush 200 of the present invention can be used with any input surface 500, including non-electronic and non-capacitive surfaces such as a wall, a canvas, a paper, a board, a desk, a table, a three-dimensional object, a statue or any other hard input surface. During use, the digital paint brush 200 communicates with the external device 600, such as the external processing device 400 or the portable device 300, which receives image data and other data from the digital paint brush 200 and generates a rendering of the painting tip hair shape and projects the shape of the painting tip hair on a display so as to generate a painted image. This embodiment would allow an artist to use a non-electronic, non-capacitive work surface, such as a desk, as the input surface for drawing or painting with the digital paint brush 200, and to see the painted image on a display of a computer or another electronic device. For example, the artist can use their desk as a graphic tablet while seeing the result of the painted image on the screen or display.

In such embodiments, the digital paint brush 200 may include multiple cameras, such as the digital paint brush 200 shown in FIGS. 4A-4B. The multiple cameras 230a-d of the digital paint brush 200 provided at different angles and capable of capturing depth information, allow for capturing images and observing contact between the painting tip 220 of the brush and the input surface 500. This capability allows for the touch event between the painting tip 220 and the input surface 500 to be determined, which triggers communication and processing between the digital paint brush 200 and the device 600 as discussed above with respect to FIG. 6. Similarly, a touch-up operation (step S690 of FIG. 6) may be determined based on images captured by the multiple cameras 230a-d.

In certain embodiments, one or more processors 250 of the digital paint brush 200 determine whether or not a touch event with an input surface has occurred based on one or more of: an output signal of the motion sensor 280a indicating that the digital paint brush 200 is being moved by a user, an output signal of the pressure sensor 280b indicating that pressure is being applied to the painting tip 220 of the digital paint brush 200, image(s) captured by one or more cameras 230a-d and any combination of two or more of these factors. For example, in some embodiments, upon detection of a motion by the motion sensor 280a in the digital paint brush 200, one or more processors 250 of the digital paint brush 200 cause one or more cameras 230a-d to be activated and to capture one or more images. The images may be captured by the cameras 230a-d continuously or at predetermined intervals. The one or more processors 250 analyze the captured images using image processing and object detection techniques to determine whether the painting tip 220 in the captured images is approaching an input surface and/or whether the painting tip 220 is in contact with the input surface. For example, the one or more processors 250 perform image processing to determine whether the shape of the painting tip 220 remains the same from one image frame to another, and when the shape of the painting tip 220 changes from one image frame to another, the one or more processors 250 determine that a touch event has occurred. In some embodiments, the one or more processors 250 perform object detection and distance measurement based on the captured image frames to determine whether an input surface is present within a predetermined distance of the painting tip 220 and whether distance between the painting tip 220 and the input surface is approaching 0. When the distance between the painting tip 220 and the input surface is determined to be 0, the one or more processors 250 determine that a touch event has occurred.

Upon determination of a touch event, the one or more processors 250 cause the communication interface 240 to transmit a touch event signal to the device 600 to cause the CPU 610 of the device 600 to perform the computer vision process, similar to the one shown in FIG. 6 (steps S610-S690). In some embodiments, upon determination of a touch event, the one or more processors 250 of the paint brush 200 cause the communication interface 240 to transmit a touch event signal to the device 600 together with captured image data and/or depth information to cause the CPU 610 of the device 600 to perform steps S650-S690 of the computer vision process in FIG. 6.

In this illustrative example, the one or more processors 250 may use similar image processing and object detection techniques to determine whether or not a touch-up operation has occurred and upon a determination that a touch-up operation has occurred, cause the communication interface 240 to transmit a touch-up event signal to the device 600.

In another example, the one or more processors of the digital paint brush 200 determine whether a motion is detected by one or more motion sensors 280a, and upon detection of a motion, the one or more processors 250 activate the cameras 230a-d to capture images and transmit the captured images to an external device 600, such as a computer, a tablet, a smart phone, etc. The CPU 610 of the external device 600 then performs the image processing and object detection to determine, based on the received images, whether or not a touch event has occurred.

In the above embodiments, when a touch event is detected either by the one or more processors 250 of the digital paint brush or by the CPU 610 of the external device 600 the computer vision process shown in FIG. 6 (Steps S650-S690) or a similar process thereto is performed in order to determine the 3-dimensional shape of the painting tip hair. The touch-up operation may be similarly detected by the CPU 610 of the device 600 using image processing and object detection techniques.

In other embodiments, detection of application of pressure to the painting tip 220 by the pressure sensor 280b may be used for determining whether a touch event and/or a touch-up operation has occurred. The outputs of the pressure sensor 280b may be used alone or in combination with the above-described techniques based on captured images.

Although FIG. 1B shows a single digital paint brush 200 being used with the input surface 500, it is contemplated within the scope of the invention that multiple digital paint brushes having similar configurations with similarly or differently shaped painting tips may be used with the same input surface 500. Each of the digital paint brushes 200 communicate with the external device 600 to receive and transmit data necessary to perform the computer vision processing as shown and described above and for the CPU 610 of the external device 600 to generate a combined painted image based on the inputs by the digital paint brushes 200 to the input surface 500. This application would allow multiple artists to work on a shared space, such as a mural, with multiple users painting together. In some embodiments, the input surface can be a collection of large displays (e.g., TV screens) connected together or a surface projected onto a hard surface, e.g., a wall, by a projector so that multiple artists can use the digital paint brushes 200 on the input surface and simultaneously view the painted image as it is being generated. One exemplary application of this embodiment is an immersive interactive art experiment or exhibit open to visitors where they can collaborate to create a painted image together. Similarly, the system of FIG. 1A may also be adapted for use with multiple digital paint brushes 200 by different artists working together to create collaborative painted images.

In the embodiments described above, the hair of the painting tip is formed from capacitive hair-like strands or filaments. In other illustrative embodiments, the hair of the painting tip comprises "smart" filaments which are configured to determine and communicate their individual shapes in a 3-dimensional space and/or their points of contact with a capacitive screen to the paint brush processor(s). In some embodiments, the "smart" filaments are configured to sense pressure applied to the touchscreen and to determine and output the amount of pressure applied by individual "smart" filaments to the touchscreen. With such "smart" filaments, the one or more processors of the digital paint brush and/or the CPU 610 of the external device 600 would be able to use the outputs from the "smart" filaments to accurately determine the shape of the painting tip hair in contact with the touch screen and to detect contact and touch-up operations.

Image Segmentation Process

As discussed above, the computer vision algorithm uses an image segmentation technique to determine the shape of the painting tip hair. Image segmentation is a process of dividing an image into multiple segments or regions, each of which corresponds to a different object. In this process, each pixel in the image is marked as belonging to a background or to a specific object, with the region of interest (ROI) corresponding to the specific object. In the present invention, the image segmentation process determines which regions in the image(s) captured by the camera(s) 230 belong to the ROI corresponding to the painting tip of the digital paint brush 200, including the hair of the painting tip.

Figure 7A:
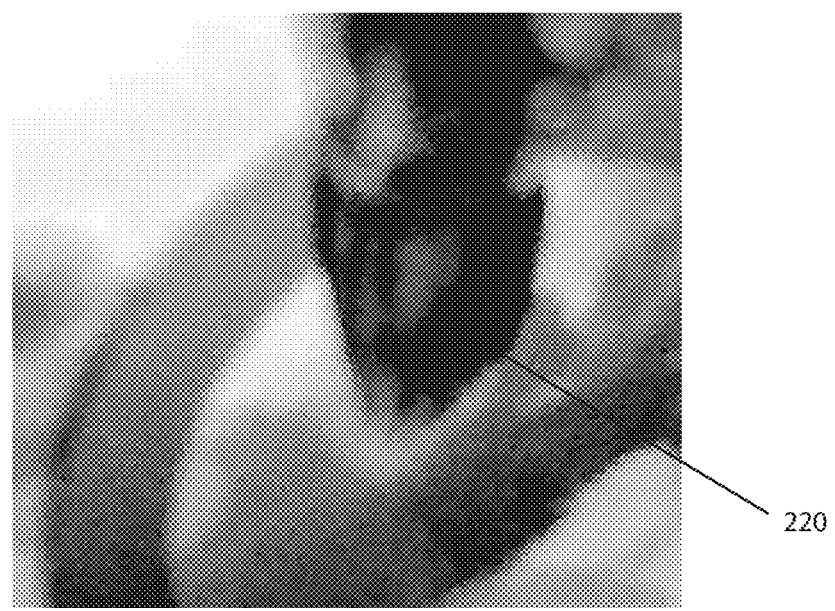
FIGS. 7A-7C show a captured image from the digital paint brush and image segmentation performed on the captured image.
Figure 7B:
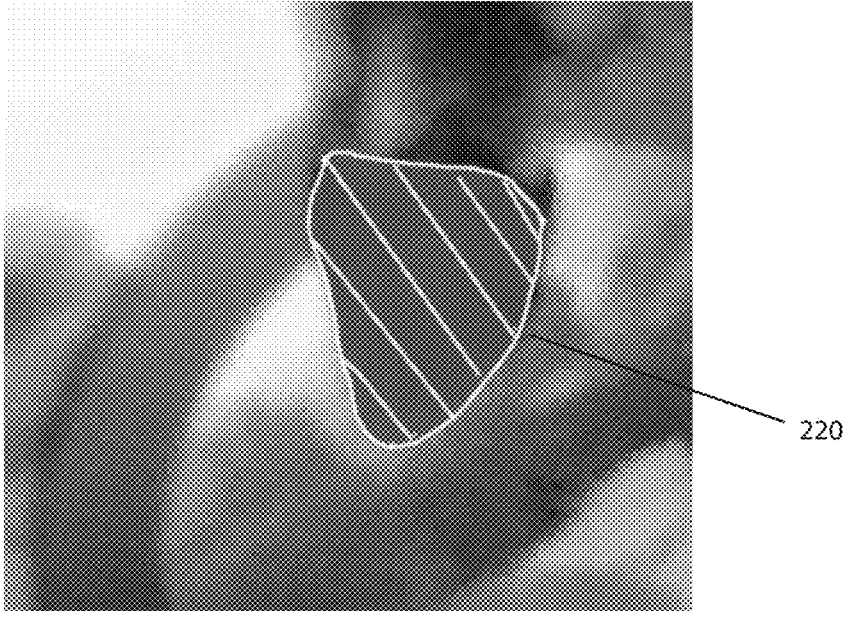
Figure 7C:
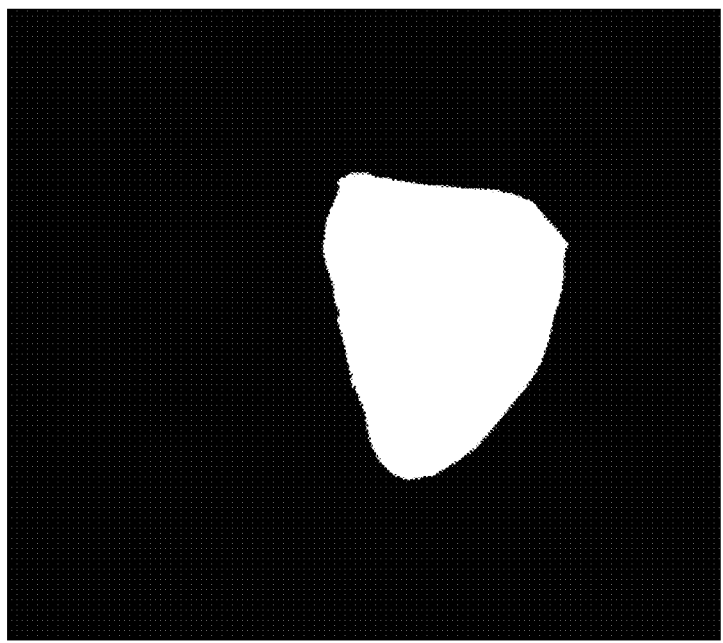

FIG. 7A shows an example of an image captured by a camera 230 of the digital paint brush 200 that includes the painting tip 220. FIG. 7B shows an outline of the painting tip 220 in the captured image and FIG. 7C shows a segmentation mask generated after performing the image segmentation process on the captured image of FIG. 7A.

Figure 8:
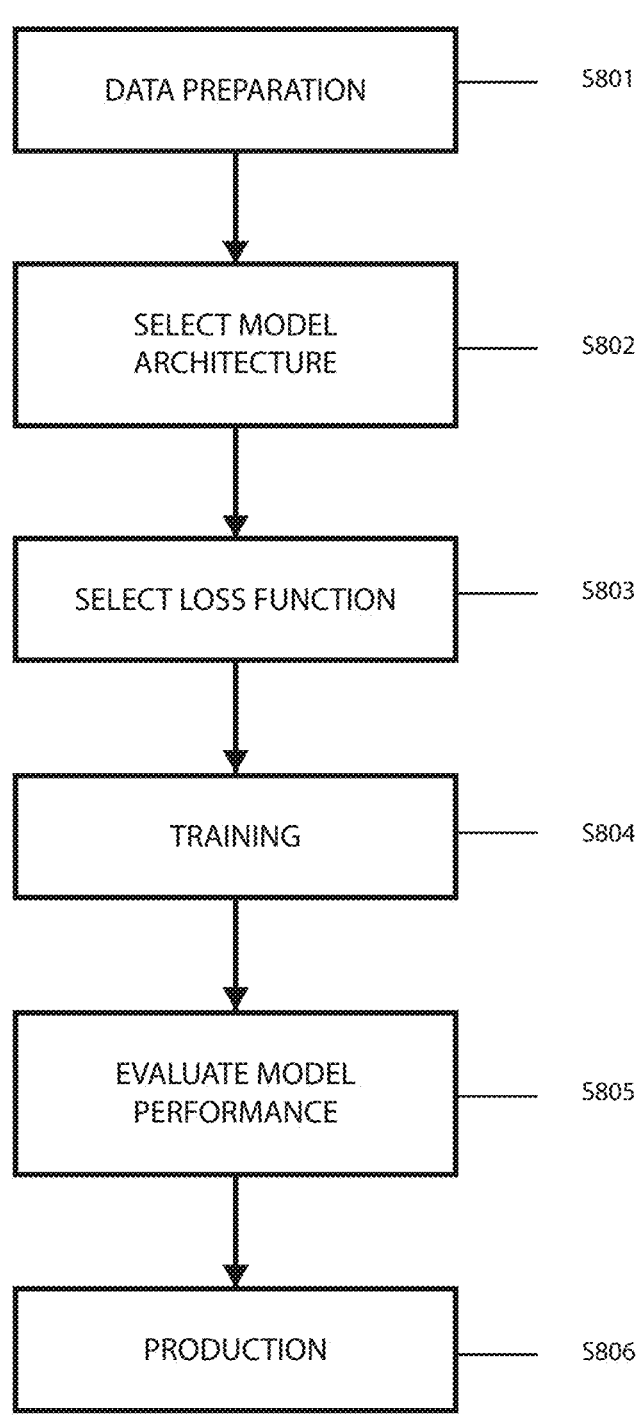
FIG. 8 shows an overall flowchart of creating an image segmentation model.

The image segmentation model is a trained image segmentation machine learning model, which is executed by one or more processors or CPU of a computing device, such as the external device 600 shown in FIG. 1C. The image segmentation model is created and trained using an image segmentation deep neural network, and a process involved in creating a usable and trained image segmentation model is shown in FIG. 8. The creation and training of the image segmentation model is performed on the external device 600 of FIG. 1C in some embodiments, while in some embodiments, all or a portion of this creation and training process can be performed by a different computing device with an image segmentation deep neural network.

In the process of FIG. 8, a data preparation step S801 is performed by assembling a training dataset that includes images and their corresponding segmentation masks. The training dataset can include hundreds, thousands or millions of images that create a reference showing what the image segmentation model is supposed to do, and for training the image segmentation model, each training sample includes at least one image and its corresponding segmentation mask. An exemplary training sample includes a black and white image taken by a camera, such as the camera 230 of the paint brush 200 or a different camera, and a corresponding segmentation mask in which black pixels correspond to a background and white pixels correspond to a target object, i.e., painting tip, the shape of which is being predicted. An example of an image taken by the camera is shown in FIG. 7A and a corresponding segmentation mask is shown in FIG. 7C. The training sample images will be used to train the deep learning neural network to learn to identify the shape of the target object, which corresponds to the painting tip 220 of the paint brush 200.

In step S802 of the process, model architecture is selected for training from different available models that are deep neural networks with multiple layers of convolution. Suitable models include Mask R-CNN, which is an image segmentation model built on top of the object detection model Faster R-CNN, a Fully Convolutional Network (FCN) that uses a series of convolutional and deconvolutional layers to learn feature representations and generates segmentation masks, and DeepLab which uses a convolutional neural network with multi-scale representation to provide highly accurate segmentation masks. In the present embodiments, DeepLab is selected as the image segmentation model in step S802. DeepLab is capable of performing Atrous Convolutions which allow for full resolution image features, avoid max-pooling and downsampling and allow for more precision in the final segmentation mask. In addition, DeepLab handles image features at multi-scale due to atrous spatial pyramid pooling (ASPP) which efficiently computes the feature as if the image was interpreted at multiple spatial scales, and aggregates the predictions of outlines/shapes using a fully connected conditional random field (CRF) which allows for finer scale details to be captured and to capture long range dependencies in the image. Operations of the selected image segmentation model are described in more detail below with respect to FIG. 9.

In step S803, loss function is selected in order to define metrics used by the training algorithm in training the image segmentation model. The loss function is a quantity that gets optimized during the training phase of the image segmentation model with the goal of reducing the loss in order to improve precision and recall of the model. In the present embodiment, Dice Loss function, shown below in equation (1), is selected in step S803 to measure the similarity between the predicted segmentation mask and the ground truth segmentation mask:

$$\text{Dice Loss} = 1 - (2 \times \text{intersection})/(\text{prediction} + \text{ground truth}) \quad (1)$$

wherein intersection is the number of pixels that are common to both the predicted and ground truth masks, prediction is the total number of pixels in the predicted mask, and ground truth is the total number of pixels in the ground truth mask.

Dice Loss calculated using the above function ranges from 0 to 1, with a value of 0 indicating that there is no overlap between the predicted and ground truth masks, and a value of 1 indicating a perfect match between the two masks. By optimizing this loss, the image segmentation model is trained to predict the same masks as the one provided in the training dataset.

Although the present embodiment utilizes the Dice Loss function for optimization of the image segmentation model, in other embodiments, other loss functions may be used. For example Cross-Entropy Loss function or Intersection over Union (IoU) Loss, also called Jaccard Loss, function may be selected instead of the Dice Loss function. Cross-Entropy Loss is a loss function used for image segmentation and measures the dissimilarity between the predicted probability distribution and the true distribution using equation (2) below:

$$L = -1/N\Sigma[G(i, j) * \log(P(i, j)) + (1 - G(i, j)) * \log(1 - P(i, j))] \quad (2)$$

wherein L is Loss to be calculated, N is the number of pixels in the image, G (i,j) is the real label (ground truth) of pixel at coordinates (i,j), P (i,j) is the probability computed by the model of pixel i,j to be of the class indicated by G (i,j), and Log is the logarithm function. The range of Cross-Entropy Loss calculated using the function is between 0 and infinity ($\infty$), wherein L is 0 when all of the pixels are correct, and L is $\infty$ when all pixels are wrong.

The IoU Loss or Jaccard Loss function calculates the overlap between the predicted and actual values using equation (3) below:

$$L = \text{Jaccard Loss} = 1 - (|P \cap G| / |P \cup G|) \quad (3)$$

wherein P is the prediction surface and G is the ground truth surface. The range of IoU Loss (L) is between 0 and 1, wherein L is 0 when all of the pixels are correct with a full overlap between predicted and actual values, and L is 1 when the pixels are wrong and there is no overlap.

Figure 10:
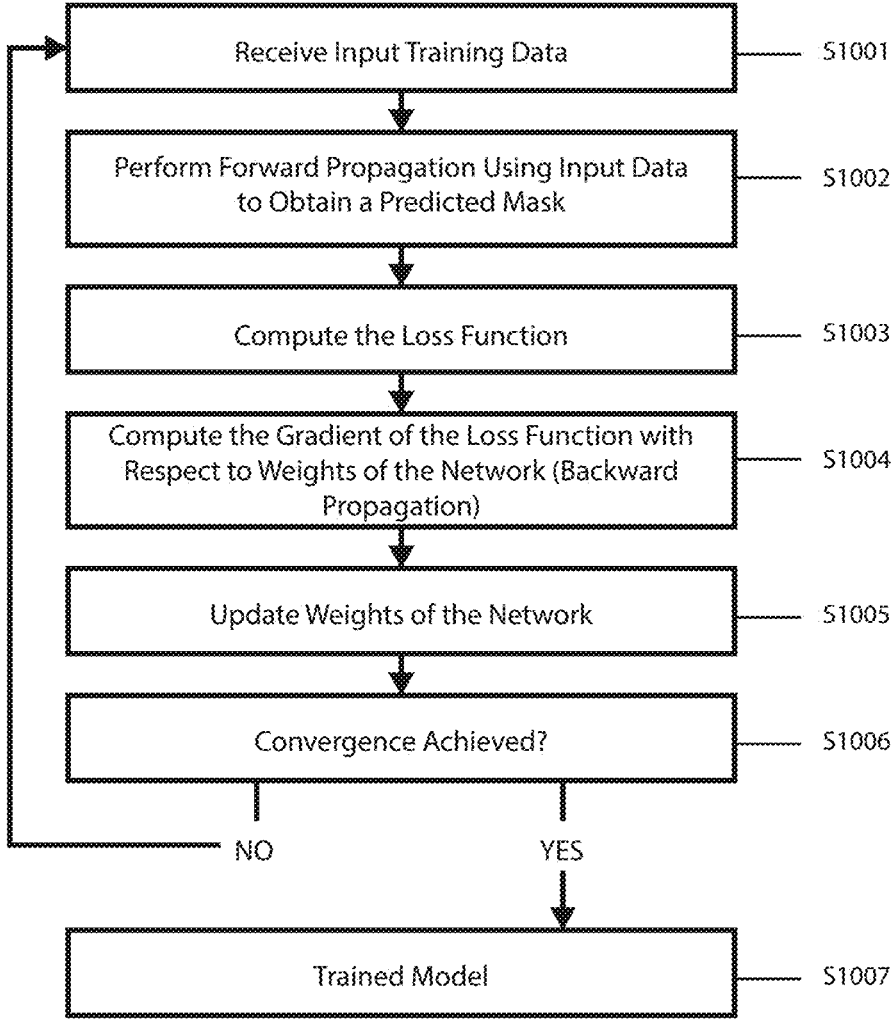
FIG. 10 shows an exemplary training process of training a neural network.

In the next step S804, the image segmentation model is trained using the training dataset assembled in step S801, with the model architecture selected in step S802 and the loss function selected in step S803, in order to prepare the image segmentation model for production. An overall process of training a deep neural network of the selected model architecture uses back propagation, which involves repeatedly passing training data (assembled in step S801) through the deep neural network (model architecture selected in step S802), computing the loss function (using the loss function selected in step S803), computing a gradient of the loss function with respect to model weights, updating the weights and repeating the process until the loss is minimized. The training process is shown in FIG. 10 and described in more detail below.

In step S805, the performance of the trained image segmentation model is evaluated by providing a new dataset representing real world data to the trained image segmentation model and performing image segmentation on the new dataset. The image segmentation results and predictions of the painting tip outlines are also reviewed manually to spot any dysfunction or drifting of the model and to validate that the loss function is representative of the segmentation masks. Finally, in step S806, the trained and evaluated image segmentation model is put into production by putting the trained image segmentation model online or on the device 600 to make predictions regarding the painting tip hair shape in real time based on inputs from the sensors and camera(s) received from the digital paint brush.

Figure 9:
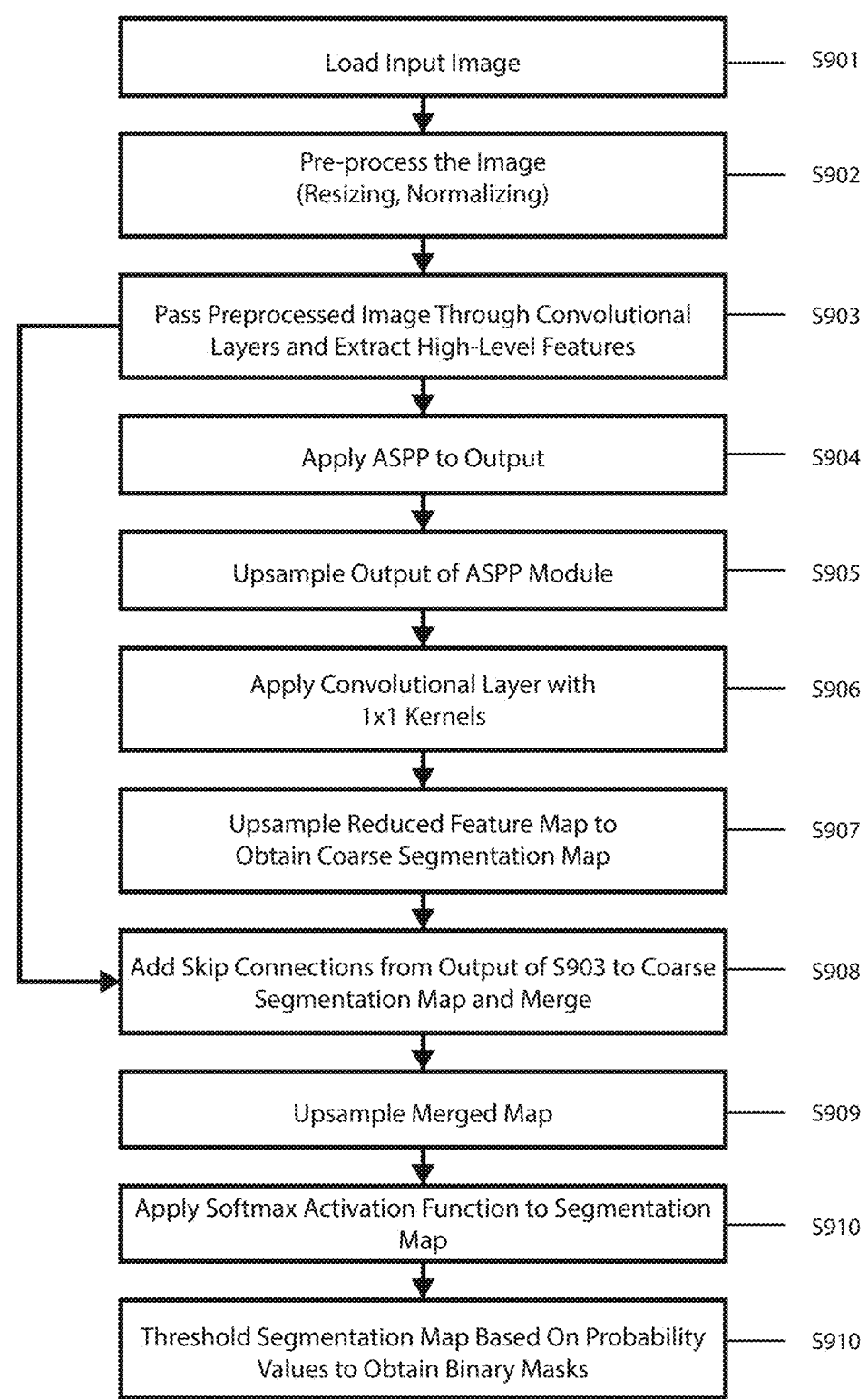
FIG. 9 shows a process performed by a deep neural image segmentation network to obtain a binary mask identifying a region of interest (ROI) in an image.

FIG. 9 shows in more detail the process performed by the deep neural image segmentation network to analyze an input image and perform image segmentation. This process is performed by at least processor or CPU of the device executing the deep neural image segmentation network stored in a storage medium. This process is performed by the selected model architecture during the training process in step S804 of FIG. 8 using the training dataset created in step S801 of FIG. 8 in order to train the image segmentation model. In some embodiments, multiple models are trained in step S804 of FIG. 8, and in step S805 of FIG. 8, performance metrics are calculated for each trained model and the trained model with the best metrics is selected. In such embodiments, the selected trained model with the best metrics is used for analyzing input images and performing image segmentation using the process of FIG. 9. In addition, in some embodiments, the trained image segmentation model created using the process of FIG. 8 performs this method using newly input image data received from one or more cameras 230 of the digital paint brush 200.

As shown in FIG. 9, in step S901, an input image is loaded to the deep neural image segmentation network. As mentioned above, the deep neural image segmentation network can be the image segmentation model being trained and tested, or can be a trained image segmentation model. In step S902, transformation processing is applied to the input image whereby the image is pre-processed so as to resize and normalize the image. The input image may be obtained from the training dataset when the process of FIG. 9 is used for training the image segmentation model. When the process of FIG. 9 is used by the trained image segmentation model, the input image corresponds to image data received from one or more cameras 230 of the digital paint brush 200.

In step S903, the pre-processed image is passed through a series of convolutional layers in order to extract high-level features from the image. In step S904, atrous spatial pyramid pooling (ASPP) is applied to the output of the convolutional layers to capture features at different scales and the output of the ASPP module is then upsampled in step S905 using bilinear interpolation to obtain a feature map with the same size as the input image.

In step S906, a convolutional layer with 1×1 kernels is applied to reduce the number of channels in the feature map, the reduced feature map is then upsampled in step S907 using bilinear interpolation to obtain a coarse segmentation map, and in step S908, skip connections from the output of earlier convolutional layers in step S903 are added to the coarse segmentation map and are merged using element-wise addition to obtain a merged segmentation map.

Then, in step S909, the merged segmentation map is upsampled using bilinear interpolation to obtain the final segmentation map. In step S910, a Softmax activation function is applied to the final segmentation map to obtain a probability distribution over different classes, and in step S911, a thresholding algorithm is applied to the final segmentation map based on the probability values obtained in step S910 so as to obtain the final binary mask. The final binary mask obtained in step S911 identifies a region of interest (ROI) in the input image. The ROI corresponds to the painting tip of the digital paint brush in the input image, similar to the painting tip shown in FIG. 7C.

FIG. 10 shows in more detail the training process for training the image segmentation model in order to prepare the image segmentation model for production. This process is performed by at least processor or CPU of the device with the deep neural image segmentation network stored thereon. As shown in FIG. 10, in step S1001 of the process, training data, such as the data assembled in step S801 in FIG. 8, is input to the image segmentation model being trained. In step S1002, forward propagation is performed using the input training data to obtain a predicted mask. Specifically, the input training data is passed through the neural network of the image segmentation model, wherein each layer in the neural network applies a set of weights to the input training data, computes an activation function and passes the output to the next layer. The predicted mask obtained in step S1002 is the output of the final layer in the neural network.

In step S1003, loss function is applied and computed using the predicted mask output in step S1003. The loss function measures the difference between the predicted mask output in step S1003 and a true output. As discussed herein above, the loss function used in the present embodiment is Dice Loss. However, other loss functions may be suitable for use in the training process.

In step S1004, backward propagation is performed by computing the gradient of the loss function with respect to the weights of the neural network. In this embodiment, the gradient is computed by using the chain rule of calculus, which allows the gradient to be computed layer-by-layer starting from the output layer and working backwards. The gradient computed in step S1004 represents a direction in which the weights should be adjusted in order to reduce the loss function.

In step S1005, the weights of the neural network of the image segmentation model are updated in the direction of the negative gradient, based on the gradient computed in step S1004. The adjustment of the weights can be performed using an optimization algorithm, such as a stochastic gradient descent (SGD) or Adam algorithm. These algorithms make small adjustments to the weights in the direction of the negative gradient in order to optimize the value of the weights. In certain embodiments, the size or amount of the adjustments to the weights, as a hyper parameter, can be optimized.

In step S1006, the at least one processor or CPU determines whether convergence has been achieved. Specifically, the at least one processor or CPU determines whether the loss function has been minimized and whether the predicted image segmentation masks are accurate, i.e., within a predetermined threshold of error when compared with the true output mask. If it is determined in Step S1006 that convergence has been achieved, then a trained image segmentation model is obtained in step S1007 and the process ends. However, if it is determined that convergence has not been achieved, then steps S1001 are repeated iteratively until convergence is achieved. In each iteration, new training data is received and fed through the neural network and the weights are updated in step S1005 based on a gradient of the loss function computed in step S1004. With each iteration of the process in FIG. 10, the image segmentation model is trained to output an increasingly more accurate prediction mask until it is determined that convergence is achieved and the image segmentation model is capable of consistently making accurate predictions regarding the shape of the painting tip of the digital paint brush.

Sensor Fusion Process

As discussed above with respect to the computer vision process of FIG. 6, the CPU executes the sensor fusion process (step S660 in FIG. 6) to merge the image data corresponding to the received images and depth information. When a digital paint brush 200 with multiple cameras 230, such as the paint brush shown in FIGS. 4A-B, is used for digital painting, one or more of the camera(s) 230a-d can be selected to capture depth information. In such embodiments, image sensors of the selected cameras capture a regular color image of the painting tip 220 of the paint brush and a grayscale image of the painting tip with a depth map that indicates distance between the image sensor and the painting tip 220. The depth maps obtained from multiple cameras are then combined by the sensor fusion process to create a high-quality 3-dimensional surface model of the painting tip 220 of the digital paint brush 200. In the present embodiment, the sensor fusion process includes a depth fusion algorithm for combining the depth maps obtained from the grayscale images captured by the cameras 230a-d and to perform 3D reconstruction of the painting tip shape. However, other multi-sensor 3D reconstruction algorithms capable of precise 3D reconstruction of the painting tip shape may be suitable for use in the sensor fusion process.

Figure 11:
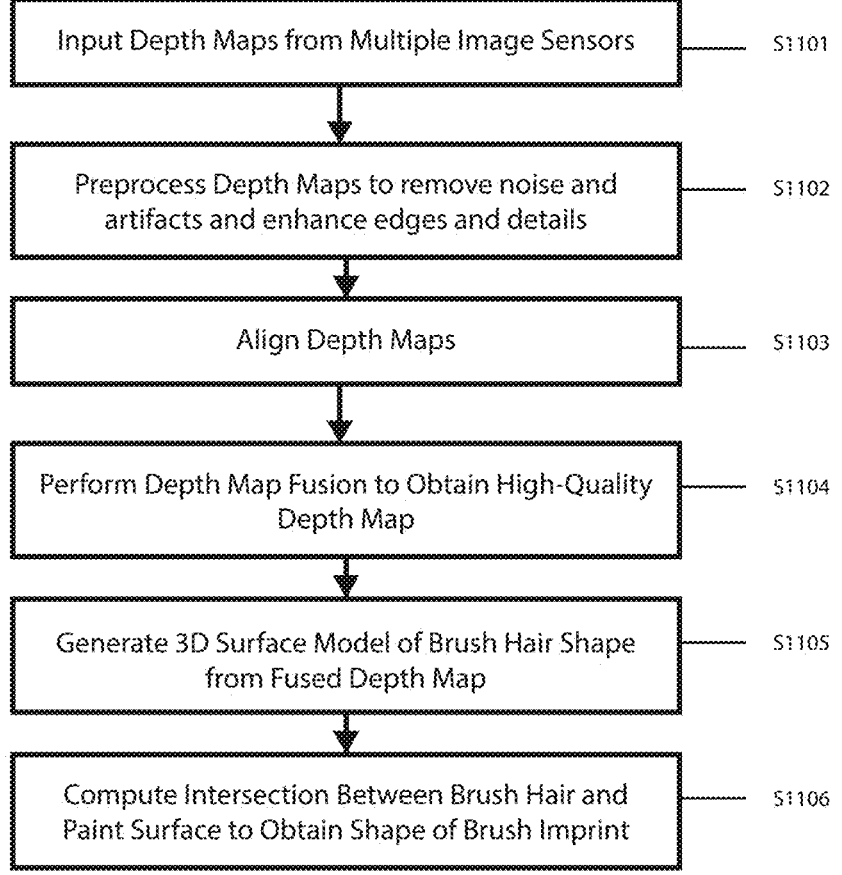
FIG. 11 shows an exemplary process performed by a 3D reconstruction algorithm.

The sensor fusion process performed by the at least one processor or CPU of the device 600 is described in more detail below with reference to FIG. 11. In the process of FIG. 11, in step S1101, individual depth maps obtained from multiple image sensors of the cameras 230a-d of the digital paint brush 200 are input into the algorithm performed by the at least one processor or CPU. As mentioned above, the depth maps are obtained from grayscale images of the painting tip captured by selected cameras 230a-d. In step S1102, the input depth maps are subjected to pre-processing by the at least one processor or CPU so as to remove noise and artifacts and to enhance edges and details of the painting tip images. The pre-processing of the depth maps can be performed by image processing using filtering and smoothing techniques.

In step S1103, the pre-processed depth maps output in step S1102 are aligned with respect to one another so that they are positioned in the same coordinate system. The alignment of the depth maps is performed deterministically by the at least one processor or CPU using camera information of the selected cameras 230a-d, which includes, for each selected camera 230a-d, one or more of a camera angle, a field of view, focal length and other information.

In step S1104, aligned depth maps are combined using a fusion technique to produce a single high-quality depth map of the scene with the painting tip. In this illustrative embodiment, a weighted average of the aligned map is used as the fusion technique for combining the depth maps. However, in other embodiments, other fusion techniques may be utilized. The fused depth map output in step S1104 is then used to generate a 3-dimensional surface model of the painting tip in step S1105. Suitable algorithms used for generating the 3D surface model of the painting tip from the fused depth map include a Marching Cubes algorithm, a Poisson Surface Reconstruction algorithm or another meshing algorithm. The generated 3D surface model obtained in step S1105 is then used in step S1106 to compute an intersection between the painting tip hair and the flat input surface so as to deduce and output the shape of the painting tip imprint on the input surface.

Steps S1101-S1106 of the process shown in FIG. 11 shown in pseudo-code are as follows:

```
                Input: N depth maps D1, D2, ..., DN
                Preprocess each depth map:
            for i in range(N):
                Di = preprocess(Di)
                Align the depth maps:
            for i in range(2, N):
                Di = align(Di, D1)
                    Combine the depth maps:
                fused_depth_map = zeros_like(D1)
                weight_map = zeros_like(D1)
                for i in range(N):
                    weight = compute_weight(Di)
                    # Compute a weight for each depth map
                    fused_depth_map += weight * Di
                    weight_map += weight
                # Normalize the fused depth map:
                fused_depth_map = fused_depth_map / weight_map
                    Generate the 3D surface:
                surface = generate_surface(fused_depth_map)
                    Return the final 3D model:
                return surface
```

The sensor fusion process performed by the at least one processor or CPU enables the device 600 to estimate a 3D outline of the painting tip of the digital paint brush and thus, to more accurately estimate the surface of contact between the painting tip and the input surface, which can be a capacitive screen (touchscreen) or another input surface (e.g., wall, desk, canvas, television screen, etc.). This allows for more accurate renderings of the hair shape in the painted image and a more accurate and more realistic output of the painted image.

Additional Refinements

As mentioned herein above, in some embodiments, the at least one processor or CPU of the external device 600 executes additional processes and algorithms that provide additional refinements and features for generating realistic painted images. In certain embodiments, after obtaining the outline of the painting tip of the digital paint brush using image segmentation and/or sensor fusion described herein above, the at least one processor or CPU adds grain, such as irregularities, to the outline of the painting tip. The addition of grain to the outline of the painting tip improves the realism and fidelity of the painting tip outline. The processes for addition of grain to the painting tip outline are described herein below.

Figure 12A:
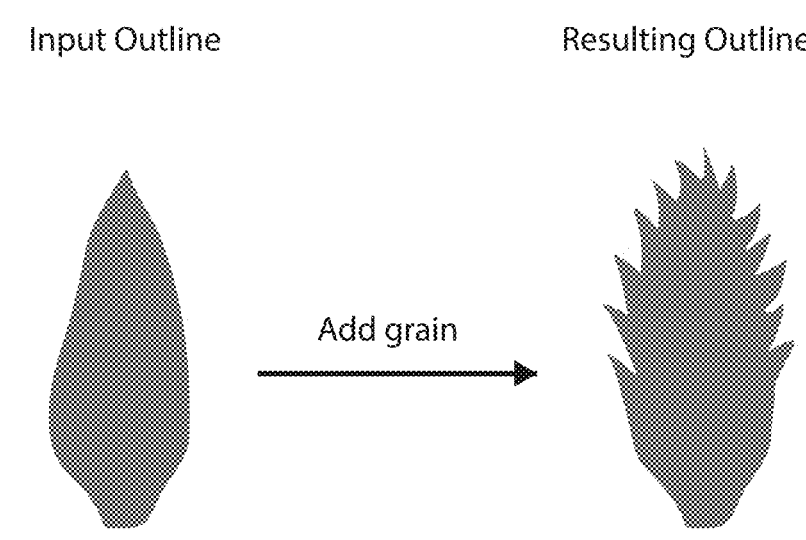
FIGS. 12A-B shows examples of an input painting tip outline and a resulting painting tip outline with irregularities generated by a trained machine learning model.
Figure 12B:
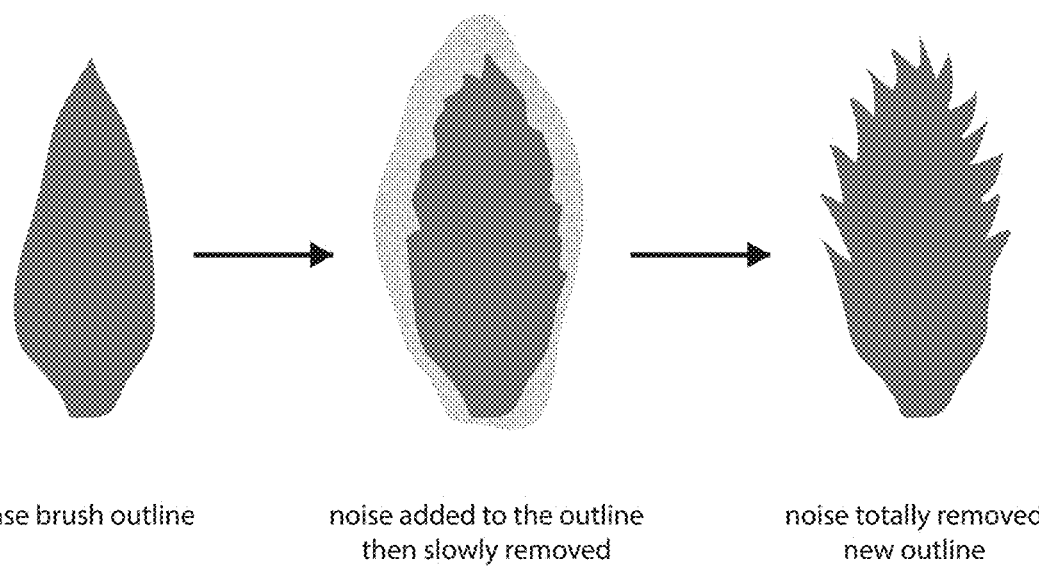

In some embodiments, the irregularities in the hair of the painting tip of the digital paint brush are generated based on high-resolution image captures of the painting tip hair. In these embodiments, a generative machine learning model is trained using thousands of images of high-resolution painting tip hair so that the trained model can then receive an outline of the painting tip generated as described above and add irregularities to the outline. An example of the painting tip outline input into the trained model and the resulting painting tip outline with irregularities is shown in FIG. 12A. FIG. 12B shows the input painting tip outline and the resulting outline, similar to those of FIG. 12A, and also shows an intermediate painting tip outline with noise added to the outline before the noise is removed.

The machine learning model for addition of irregularities to the painting tip outline is trained on a large training dataset of masks showing painting tip hair, and is configured to perform inpainting to fill in an area of an image with new pixels that match the requirements of the machine learning model. In this embodiment, the machine learning model requires creating of high-resolution details of painting tip hair based on a probability distribution of the training dataset. Moreover, the machine learning model is generative so that each new sample that is generated is original and unique. The machine learning model does not repeat the training dataset but instead generates a probabilistic distribution of pixels that matches the probabilities of the training dataset. In some embodiments, the machine learning model used for training to add irregularities and grain to the painting tip outline is a diffusion model with inpainting capabilities, such as Stable Diffusion.

Figure 13:
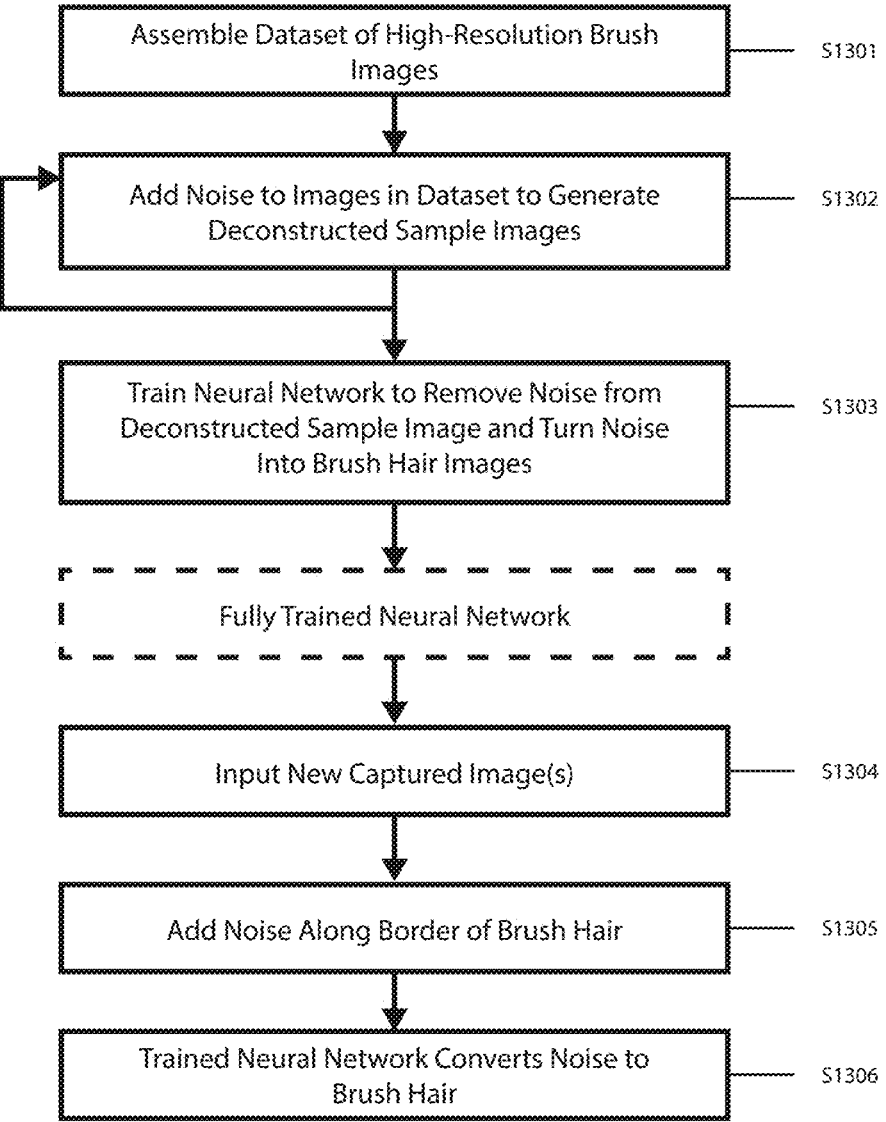
FIG. 13 shows an exemplary process of training a neural network to convert noise into paint brush hair images and application of trained neural network.

FIG. 13 shows a method for implementing addition of grain to the brush hair using inpainting and Stable Diffusion, in which a neural network is trained to convert random noise into a target image which includes a high-resolution photograph of a paint brush with hair details. As shown in FIG. 13, in step S1301, a training dataset of high-resolution brush images that include a lot of details of the brush hair is assembled. In step S1302, noisy samples of deconstructed sample images are generated by adding random Gaussian noise to the images included in the training dataset assembled in step S1301. The noisy samples in step S1302 are repeatedly generated, and the more noise steps added to the samples, the more the images are deconstructed and have an appearance of random noise.

In step S1303, the neural network is trained to remove the noise from each deconstructed sample image and to convert the noise into brush hair images. Specifically, the neural network is trained to reconstruct an image that includes gaps in it due to the presence of noisy pixels. In certain embodiments, U-Net convolutional neural network is trained by reconstructing the deconstructed sample images generated in step S1302. After the neural network is fully trained in step S1303, the fully trained network is capable of converting any random noise into an image of a high-resolution paint brush that has the same probability distribution as the training dataset.

After step S1303, the fully trained neural network is put into production and can be used with newly captured image(s). The fully trained neural network is stored in the non- transitory storage medium and is executed by the at least one processor or CPU of the device 600 when the digital paint brush 200 is used by a user and images captured by the camera(s) of the digital paint brush 200 are received by the device 600 and are used for generating an outline of the painting tip with added grain, i.e., hair details. Thus, it is understood that steps S1301-S1303 in FIG. 13, which correspond to assembling the training dataset and training the neural network using the assembled dataset, may be performed separately, and in some embodiments on a different computer-implemented device, from the subsequent steps S1304-S1306, which correspond to the process of using the fully trained neural network to convert noise in captured images to brush hair during the use of the digital paint brush 200.

When the digital paint brush 200 is in use and stable diffusion with inpainting is executed by the fully trained neural network for adding grain to the outlines of the painting tip, the at least one processor or CPU of the device 600 performs steps S1304-S1306. In step S1304, newly captured image(s) of the painting tip are received from the digital paint brush 200. Image segmentation processing may be performed on the received images to generate one or more image segmentation masks with a painting tip outline as described above. The at least one processor or CPU then adds noise along the border of the painting tip outline, as shown in the intermediate outline in FIG. 12B, in step S1305. The at least one processor or CPU introduces noise only in the region of interest, which is a peripheral outline of the painting tip. The fully trained neural network then reconstructs the details of the hair in the outline of the painting tip by converting the added noise to brush hair of the painting tip in step S1306. The resulting painting tip outline with noise totally removed and hair details displayed is shown in FIGS. 12A and 12B. The resulting painting tip outline generated by the process in FIG. 13 can then be used in the processes of FIGS. 5 and 6 for rendering the projected hair shape in steps S560-S580 of the process in FIG. 5 and steps S660-S680 of the process in FIG. 6.

In some embodiments, the hair details of the painting tip to add irregularities and grain to the painting tip outline are achieved by simulating the behavior of the painting tip using a simulated 3D model. In such embodiments, a simulated 3-dimensional model of the painting tip is used in conjunction with brush pressure and other factors. Specifically, a detailed 3D model of the painting tip is generated and stored in a non-transitory storage medium, wherein in the 3D model, each hair behaves independently following the rules of physics and hair strands of the painting tip are characterized by their shape, including diameter, length and curvature, their position, flexibility and interactions with one another. In this embodiment, the at least one processor or CPU obtains velocity and path of the painting tip as well as pressure exerted on the input surface by the painting tip as the painting tip is being moved. The at least one processor or CPU then applies the obtained velocity, path and pressure values to the simulated 3D model to reconstruct and simulate a path of the painting tip in a 3-dimensional space, and as the path of the painting tip is simulated, the at least one processor or CPU simulates the distribution of the every individual strand of hair to generate a rich grain and to output the shape outline of the painting tip imprinted on the input surface.

Figure 14:
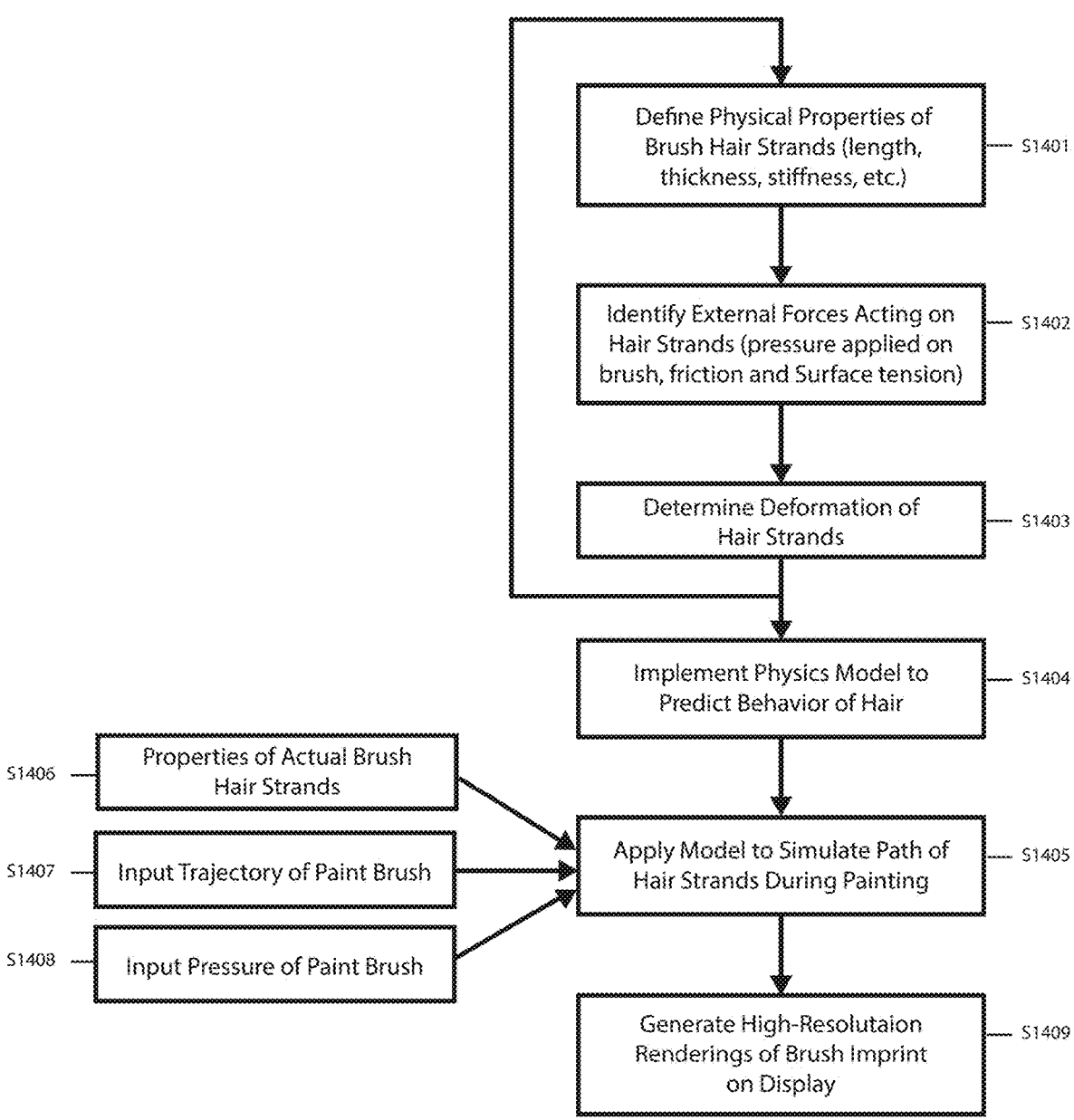
FIG. 14 shows an exemplary process of brush hair physics simulation.

FIG. 14 shows a process of creating a physics model of a painting tip hair with physical deformation so as to implement a model that simulates the path of all hair strands of the painting tip and creates a high-resolution rendering of the painting tip imprint on the display screen. The process of FIG. 14 is performed by at least one processor or CPU of a computer-implemented device, such as the device 600 of FIG. 1C.

In FIG. 14, the first step of the process S1401 is to define the physical properties of the hair strands that will be used in the model, including the length, thickness and stiffness of the hair strands. The physical properties of the hair strands of the painting tip can be measured experimentally or can be estimated based on material properties of the hair used in the painting tip. These physical properties are input as data to the computer and saved in a non-transitory storage medium. In step S1402, external forces acting on the hair strands of the painting tip when the digital paint brush is used for digital painting are identified. These external forces include pressure applied by the painter on the brush, friction between the brush and the canvas, and surface tension of the paint on the bristles. These external forces can be measured and then recorded as data in a storage medium, or in some embodiments, some or all of the external forces are estimated for different types of canvas or input surfaces and different types of paint to be simulated during use. In step S1403, the at least one processor or CPU determines deformation behavior of the painting tip hair, and specifically, the change in length and/or shape of the hair due to the external forces acting on the painting tip. In this step, the at least one processor or CPU calculates strain of the painting tip hair, including the change in the length and/or shape of the hair, in response to applied external forces using the principles of elasticity.

Steps S1401-S1403 can be repeated for different types of digital paint brushes with different painting tips, for different types of paint and/or input surfaces and with different forces applied to the painting tip.

In step S1404, the physics model is implemented to predict and simulate the behavior of painting tip hair by incorporating the physical properties of the painting tip hair defined in step S1401, the external forces acting on the painting tip hair in step S1402, and the deformation behavior of the hair determined in step S1403 into a computational model which can simulated and predict the behavior of painting tip hair under different conditions, with different brush hair, different brush strokes and/or different paint types.

After the physics model is implemented in step S1404, this physics model can be used by the at least one processor or CPU for rendering the detailed shape of the painting tip hair on the display screen when the digital paint brush 200 is used by a user. Steps S1401-S1404 may be performed separately from the remaining steps S1405-S1409, and in some embodiments, steps S1401-S1404 are performed in advance on a separate computer-implemented device from steps S1405-S1409.

During use of the digital paint brush 200, the physics model created in steps S1401-1404 is executed by the at least one processor or CPU in step S1405 to simulate a path of all hair strands of the painting tip of the paint brush during painting by a user. Specifically, the at least one processor or CPU obtains physical properties of the hair of the painting tip of the brush (step S1406), a trajectory of the painting tip on the input surface (step S1407) and pressure applied by the painting tip to the input surface (step S1408) and executes the physics model from step S1404 to simulate the shape of the painting tip and the path of the hair strands of the painting tip based on the data obtained in steps S1406-S1408.

In certain embodiments, the physical properties of the hair of the painting tip of the paint brush 200 are pre-stored and are obtained by the at least one processor or CPU from storage based on a type of digital paint brush 200 used by the user and connected to the device. The type of the digital paint brush 200 may be identified based on signals and/or data received from the digital paint brush 200. For example, the digital paint brush 200 may send data to the device 600 at the time of establishing a communication connection with the device, or at a later time after the connection with the device is established. In other embodiments, the digital paint brush 200 transmits to the device 600 the physical properties of the hair of the painting tip, which may be performed automatically at the time of connecting to the device 600 or thereafter, or may be performed in response to receiving a request for the physical properties from the at least one processor or CPU of the device 600.

In some embodiments, the trajectory of the painting tip of the paint brush in step S1407 is obtained by the at least one processor or CPU based on touch signals received from the touchscreen input surface. In other embodiments, the trajectory of the painting tip is obtained based on motion information received by the device 600 from the digital paint brush 200 based on sensed motion by the one or more motion sensors 280a. In yet other embodiments, a combination of touch signals and motion sensor information can be used to determine the trajectory of the painting tip.

In certain embodiments, pressure applied by the painting tip to the input surface in step S1408 is received from the digital paint brush 200 based on sensed pressure by the one or more pressure sensors 280b in the paint brush. In other embodiments, pressure is determined by the at least one processor or CPU of the device based on distortion of the painting tip hair in the captured images due to pressure applied to the painting tip. In yet other embodiments, a combination of these two methods may be used.

After the at least one processor or CPU, executing the physics model, simulates the path of the hair strands of the painting tip in step S1405, the at least one processor or CPU generates a high-resolution rendering of the painting tip imprint on the display in step S1409. By using the physics model that takes into account the physical properties of the painting tip hair as well as the trajectory and pressure of the painting tip, the at least one processor or CPU can generate renderings in step S1409 that realistically recreate painting and strokes of the paint brush in a digital medium.

Paint Simulation and Mixing

Paint simulation and mixing of paint is an important aspect of digital painting for producing digital painted images with realistic appearance. The present invention enables the device 600 to simulate paint mixing so as to mix colors to create transitional colors when simulating painting in the digital world. In the present invention, paint simulation is achieved through a machine learning process using a real-world training dataset of paint mixtures generated in the real/analog world, captured by one or more cameras and analyzed by the one or more processors and CPU of the device 600 of FIG. 1C or another computer-implemented device. For ease of understanding, the description below will refer to the device 600 of FIG. 1C as performing the paint simulation processing and controls relating thereto. However, it is understood that these processes may be performed by another, separate computer-implemented device.

Figure 15:
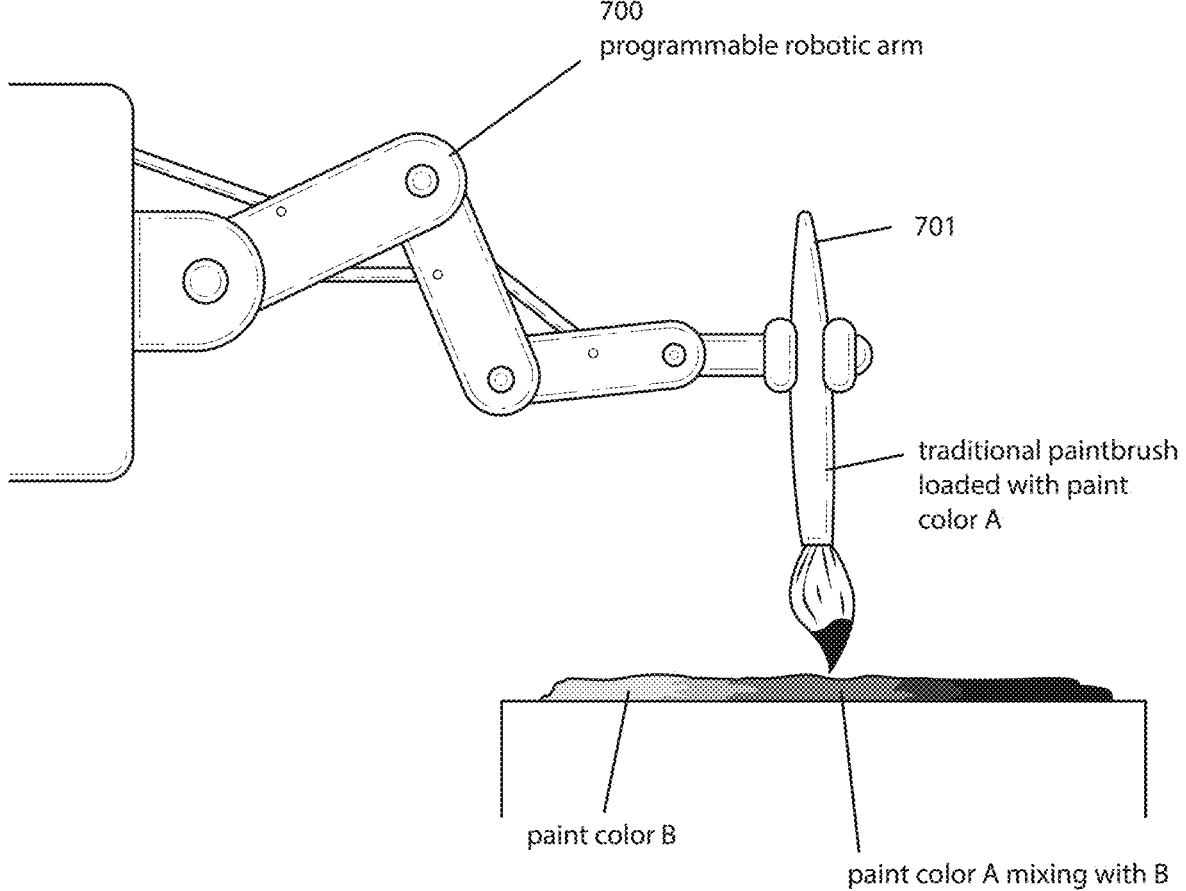
FIG. 15 shows an exemplary set up of a programmable robotic arm for mixing of paint.

In some embodiments, such as the one shown in FIG. 1C, a robotic arm 700 with a paint brush is used for generating thousands of samples of the paint brush hitting the canvas with different colors of paint on the canvas and different colors of paint on the painting tip of the paint brush. An exemplary set up with the robotic arm 700 generating samples is shown in FIG. 15. In some embodiments, the robotic arm 700 is a programmable robotic arm that can be programmed to move so as to dip a traditional paint brush 701 attached thereto into one or more selected paint colors and to mix the selected color(s) with another color provided on a canvas or other suitable analog input surface. In the example shown in FIG. 15, paint color B is provided on the input surface and the robotic arm 700 is controlled to move the paint brush 701 so as to load paint color A on its brush tip, and thereafter the robotic arm 700 is controlled to move so that the paint color A loaded on the paint brush 701 is mixed with paint color B. In certain embodiments, different paint brushes may be used with the robotic arm interchangeably so as to capture paint mixing performed by different types of paint brushes.

In certain embodiments, the programmable robotic arm is controlled by the at least one processor or CPU of the device 600 of FIG. 1C, and is in communication with the device 600 via a network, as shown in FIG. 1C, or via a wired connection or via a direct wireless connection such as Bluetooth® or NFC. As shown in FIG. 1C, the device 600 is also in communication with a camera or an optical system 800 which can be used to capture still and moving images of the samples generated using the robotic arm 700 and to communicate captured image data to the device 600.

The at least one processor or CPU of the device 600 controls selection of paint colors to be loaded on the brush tip of the paint brush 701. In addition, the at least one processor or CPU controls the robotic arm 700 so as to control the path of the brush, the velocity of the brush and the pressure applied to the brush tip when it is in contact with the canvas or other painting surface. The at least one processor or CPU also controls the camera or optical system 800 to capture high-resolution images of the paint before and after movement of the robotic arm 700 and to transmit these images to the device 600. Based on these high-resolution images, a probabilistic model is created to generate paint disturbance, including color mixing.

Specifically, thousands of before and after high-resolution images of paint are used to generate a training dataset for training a machine learning model for simulating paint mixing and brush strokes of a paint brush. In some embodiments, the before and after high-resolution images of paint included in the training dataset are processed though one or more transformations in order to align, resize and normalize the images in the training dataset. Moreover, in certain embodiments, motion information and other data is stored in association with the high-resolution images in the training dataset, including, but not limited to, trajectory of the brush tip, brush tip pressure, i.e., pressure applied to the brush tip when the brush tip is in contact with the input surface, velocity of the brush tip relative to the input surface, input colors, type of paint, type or dimensions of brush tip, etc.

In certain embodiments, the machine learning model trained using the generated and transformed training dataset is a stable diffusion with inpainting machine learning model, such as img2img Stable Diffusion neural network. Using the training dataset together with associated painting tip pressure and velocity data, the machine learning model is trained to compute a resulting paint mixing that should happen on the output display, including mixing of colors, paint splatters and similar details, which add grain and polish to the shape of the painting tip on the output display.

Figure 16:
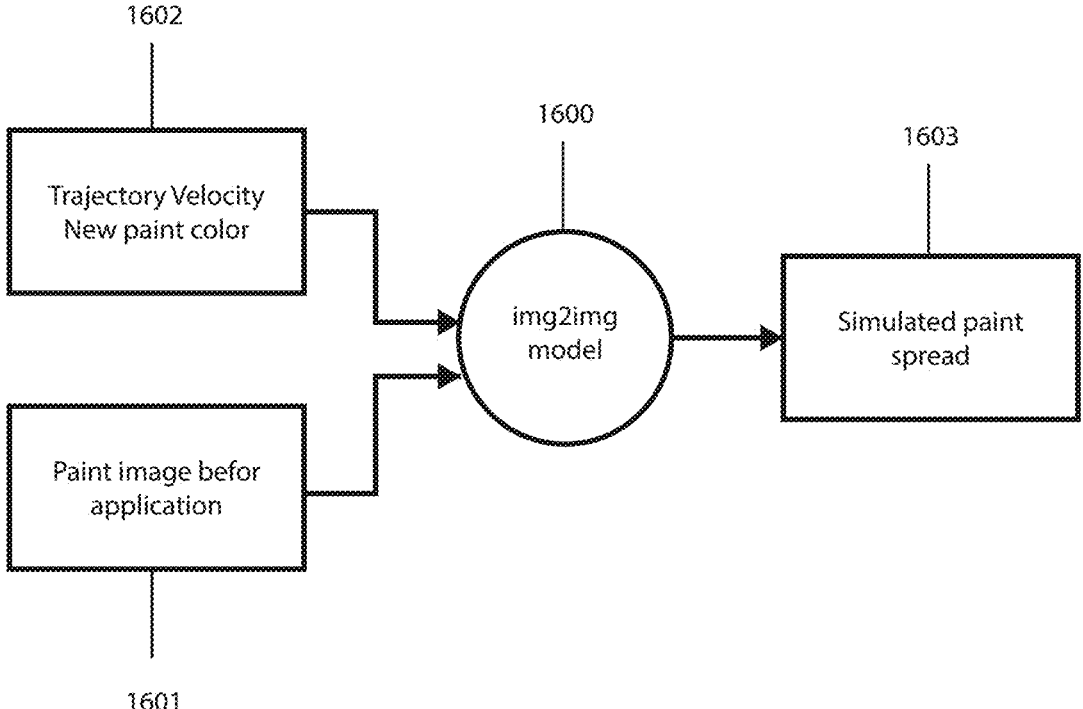
FIG. 16 shows an illustration of a paint mixing simulation using img2img Stable Diffusion model.

FIG. 16 shows an illustration of a paint mixing simulation using img2img Stable Diffusion neural network. The img2img Stable Diffusion neural network is trained based on the training dataset generated as described above to create a trained img2img Stable Diffusion model. As shown in FIG. 16, the at least one processor or CPU executing the trained img2img Stable diffusion model 1600 receives a painted image prior to application of new paint, e.g., an existing painted image, as one input in 1601 and also receives information indicating a trajectory of the painting tip of the digital paint brush, velocity of the painting tip applying paint and new paint color used by the painting tip in 1602. The trained img2img Stable Diffusion model 1600 then generates a simulated paint spread 1603 based on the inputs in 1601 and 1602 with realistic color mixing.

The trained img2img Stable Diffusion model operates similarly to inpainting described herein above with respect to FIG. 13. Specifically, after the original painted image 1601 is input, slices of random noise are added to the painted image by the at least one processor or CPU executing the trained img2img Stable Diffusion model so that the image is "buried" under the added noise. Upon receiving the trajectory, velocity and new paint color information in 1602, this information is used as a guiding "prompt" to guide the diffusion process. The at least one processor or CPU executing the trained img2img Stable Diffusion model processes the image with the added noise to progressively remove the noise from the image following the guidance of the "prompt" to generate the final output image simulating paint mixing.

Figure 17A:
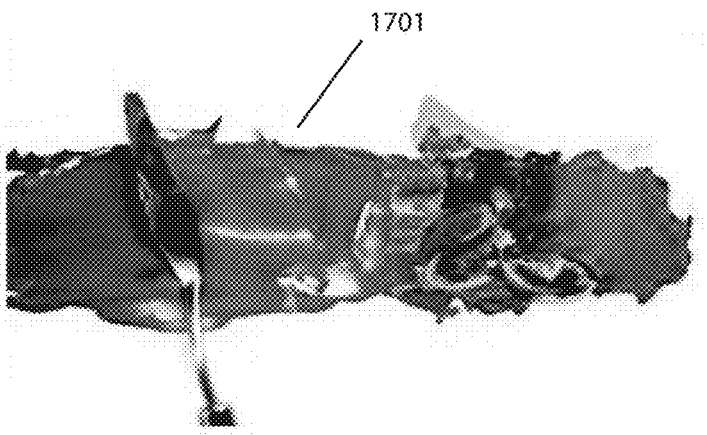
FIGS. 17A-17E show an example of processing applied to painted images during paint simulation.
Figure 17B:
Figure 17C:
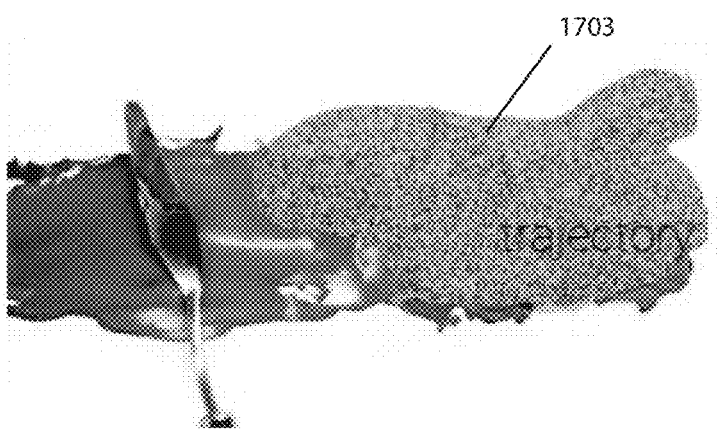
Figure 17D:
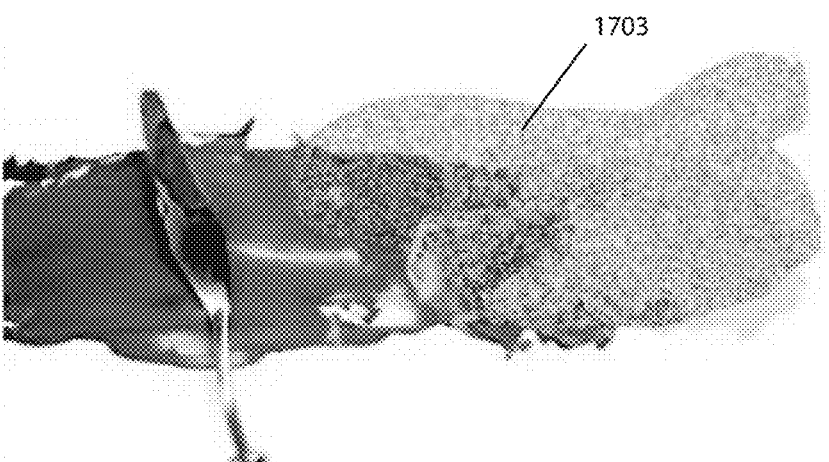
Figure 17E:
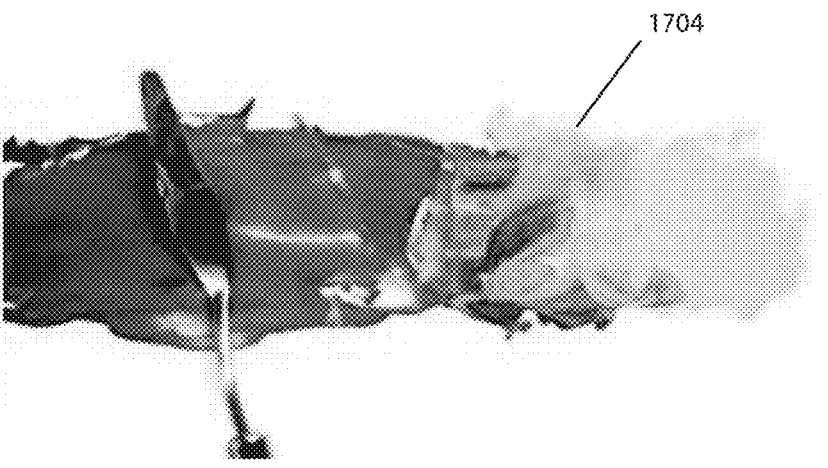

FIGS. 17A-17E show the process being performed on an input image 1701 shown in FIG. 17A by the at least one processor or CPU executing the trained img2img Stable Diffusion model. As shown in FIG. 17B, a trajectory 1702 is added to the input image based on the received information 1602 and then, as shown in FIG. 17C, the added trajectory is replaced with noise 1703 and extra thickness around it to allow for border effects. Thereafter, the noise is progressively removed as shown in FIG. 17D and the resulting prediction image 1704 with simulated paint mixing is output as shown in FIG. 17E.

The above-described process using the trained img2img Stable Diffusion model produces realistic simulations of painting with multiple colors in the digital world based on machine learning and a real-world dataset of paint mixtures. This process is capable of simulating the behavior of paint and translating this behavior into digital world so as to create painted images with a realistic appearance. Although the above-identified example trains the img2img Stable Diffusion neural network using the generated training dataset and uses the trained img2img Stable Diffusion model for simulating paint mixing, it is understood that other neural networks may be trained to create a suitable trained model for paint simulation.

It will be understood by those skilled in the art that each of the above-described processes or elements of the above-described systems comprise computer-implemented aspects, performed by one or more of the computer components described herein. For example, any or all of the processing steps involved in machine learning, image and data processing and generation of painted images on a display screen are performed electronically. In at least one exemplary embodiment, all steps may be performed electronically by one or more processors or CPUs implemented in one or more computer systems such as those described herein.

It will be further understood and appreciated by one of ordinary skill in the art that the specific embodiments and examples of the present disclosure are presented for illustrative purposes only, and are not intended to limit the scope of the disclosure in any way.

Accordingly, it will be understood that various embodiments of the present system described herein are generally implemented as a special purpose or general-purpose computer including various computer hardware as discussed in greater detail below.

Embodiments within the scope of the present invention also include computer-readable media for carrying or having computer-executable instructions or data structures stored thereon. Such computer-readable media can be any available media which can be accessed by a computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a computer executing specific software that implements the present invention, or a mobile device.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a computer or processing device such as a mobile device processor to perform one specific function or a group of functions that implement the present system and method.

Those skilled in the art will understand the features and aspects of a suitable computing environment in which aspects of the invention may be implemented. Although not required, the inventions are described in the general context of computer-executable instructions, such as program modules or engines, including trained machine learning models, algorithms, as described earlier, being executed by computers in networked environments. Such program modules are often reflected and illustrated by flow charts, sequence diagrams, exemplary displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a computing device in the form of a computer, laptop or electronic pad, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, and/or other types of computer readable media for storing data, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

Calculations and evaluations described herein, and equivalents, are, in an embodiment, performed entirely electronically. Other components and combinations of components may also be used to support processing data or other calculations described herein as will be evident to one of skill in the art. A computer server may facilitate communication of data from a storage device to and from processor(s), and communications to computers. The processor may optionally include or communicate with local or networked computer storage which may be used to store temporary or other information. The applicable software can be installed locally on a computer, processor and/or centrally supported (processed on the server) for facilitating calculations and applications.

In view of the foregoing detailed description of preferred embodiments of the present invention, it readily will be understood by those persons skilled in the art that the present invention is susceptible to broad utility and application. While various aspects have been described in the context of an exemplary embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention.

It should also be understood that, although steps of various processes may be shown and described as being in a particular illustrative sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

Accordingly, the scope of the present inventions is defined by the appended claims rather than the foregoing description and the exemplary embodiments described therein.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

What is claimed is:

1. A digital paint brush comprising:
   a handle including a housing for housing one or more electronic components;
   a painting tip attached to the handle; and
   at least one image capture apparatus including an image sensor configured to capture one or more images of the painting tip;
   wherein the at least one image capture apparatus is positioned on the handle at a predetermined distance from the painting tip such that a field of view of the at least one image capture apparatus includes the painting tip.

2. The digital paint brush in accordance with claim 1, wherein the at least one image capture apparatus includes a plurality of image capture apparatuses positioned around a circumference of the handle.

3. The digital paint brush in accordance with claim 1, wherein the one or more electronic components include at least one processor configured to control the at least one image capture apparatus to capture one or more images of the painting tip.

4. The digital paint brush in accordance with claim 3, wherein the digital paint brush is configured to communicate with an external electronic device, and the at least one processor is configured to control transmission of one or more images captured by the at least one image capture apparatus to the external device.

5. The digital paint brush in accordance with claim 1, wherein the one or more electronic components include a communication interface configured to transmit and receive data from an external electronic device.

6. The digital paint brush in accordance with claim 1, wherein the painting tip is detachable from the handle and interchangeable with one or more other painting tips.

7. The digital paint brush in accordance with claim 1, wherein the one or more electronic components include one or more of (a) a motion sensor configured to sense movement of the digital paint brush, and (b) a pressure sensor configured to sense application of pressure to the painting tip.

8. A computer-implemented system for generating digitally painted images using a digital paint brush, the system comprising:

at least one processor and a memory storing instructions executable by the at least one processor to:

control at least one image capture apparatus to obtain one or more images including a painting tip of the digital paint brush in contact with an input surface;

perform processing on the obtained one or more images to determine a shape of the painting tip in contact with the input surface; and generate a digitally painted image based on the determined shape of the painting tip;

wherein the at least one image capture apparatus is positioned on the digital paint brush at a predetermined distance from the painting tip such that a field of view of the at least one image capture apparatus includes the painting tip.

9. The computer-implemented system in accordance with claim 8, further comprising a communication interface configured to communicate with the digital paint brush, wherein the at least one processor controls obtaining the one or more images from the digital paint brush.

10. A computer-implemented system for generating digitally painted images using a digital paint brush including a handle and a painting tip, the system comprising:

at least one processor and a memory storing instructions executable by the at least one processor to:

obtain one or more images including the painting tip of the digital paint brush in contact with an input surface;

execute a painting tip physics simulation model configured to simulate a path of the painting tip based on one or more physical properties of the painting tip and at least one of a trajectory of the painting tip on the input surface and pressure applied to the painting tip in contact with the input surface; and generate a digitally painted image based on the simulated path of the painting tip;

wherein the one or more images are acquired by at least one image capture apparatus positioned on the handle at a predetermined distance from the painting tip such that a field of view of the at least one image capture apparatus includes the painting tip.

11. The computer-implemented system in accordance with claim 10, wherein the painting tip includes a plurality of strands and the one or more physical properties of the painting tip include one or more of length, thickness and stiffness of the plurality of strands.

12. The computer-implemented system in accordance with claim 10, wherein the at least one processor executing the painting tip physics simulation model is configured to determine deformation of the painting tip when the painting tip is in contact with the input surface based on the physical properties of the painting tip, the trajectory of the painting tip on the input surface and the pressure applied to the painting tip in contact with the input surface, and to simulate the path of the painting tip based on the deformation of the painting tip.

13. A computer-implemented method for generating digitally painted images using a digital paint brush, the method comprising:

receiving one or more images including a painting tip of the digital paint brush in contact with an input surface;

performing processing on the received one or more images to determine a shape of the painting tip in contact with the input surface; and generating a digitally painted image based on the determined shape of the painting tip;

wherein the one or more images is acquired by at least one image capture apparatus positioned on the handle at a predetermined distance from the painting tip such that a field of view of the at least one image capture apparatus includes the painting tip.

14. A computer-implemented method for generating digitally painted images using a digital paint brush including a handle and a painting tip, the method comprising:

obtaining one or more images including the painting tip of the digital paint brush in contact with an input surface;

obtaining one or more physical properties of the painting tip;

obtaining at least one of a trajectory of the painting tip on the input surface and pressure applied to the painting tip in contact with the input surface;

executing a painting tip physics simulation model to simulate a path of the painting tip based on the obtained one or more physical properties of the painting tip and at least one of a trajectory of the painting tip and pressure applied to the painting tip; and generating a digitally painted image based on the simulated path of the painting tip;

wherein the one or more images is acquired by at least one image capture apparatus positioned on the handle at a predetermined distance from the painting tip such that a field of view of the at least one image capture apparatus includes the painting tip.

15. The digital paint brush in accordance with claim 1, wherein the painting tip is attached to a proximal end of the handle and the at least one image capture apparatus is positioned at a predetermined distance from the proximal end.

16. The digital paint brush in accordance with claim 1, wherein the at least one image capture apparatus are configured to capture the painting tip from multiple different angles of view to generate one or more 3-dimensional outline of the painting tip in a space.

17. The digital paint brush in accordance with claim 1, wherein the at least one image capture apparatus are oriented so that an entire length or substantially the entire length of the painting tip is within the field of view of the at least one image capture apparatus.

* * * * *